(12) United States Patent
Lee et al.

(10) Patent No.: US 10,281,786 B2
(45) Date of Patent: May 7, 2019

(54) DISPLAY DEVICE USING LOW CAPACITANCE BUS LINES HAVING GATE LINES AND DATA LINES ON DIFFERENT SUBSTRATES

(71) Applicant: a.u. Vista, Inc., Milpitas, CA (US)

(72) Inventors: Seok-Lyul Lee, Hsin-chu (TW); Fang-Chen Luo, Milpitas, CA (US)

(73) Assignee: A.U. VISTA, INC., Milpitas, CA (US)

( * ) Notice: Subject to any disclaimer, the term of this patent is extended or adjusted under 35 U.S.C. 154(b) by 30 days.

(21) Appl. No.: 15/492,900

(22) Filed: Apr. 20, 2017

(65) Prior Publication Data

US 2018/0307107 A1     Oct. 25, 2018

(51) Int. Cl.

| G02F 1/136 | (2006.01) |
| G02F 1/1339 | (2006.01) |
| G02F 1/1343 | (2006.01) |
| G02F 1/1362 | (2006.01) |
| G02F 1/1368 | (2006.01) |
| G02F 1/1335 | (2006.01) |

(52) U.S. Cl.
CPC ...... *G02F 1/136286* (2013.01); *G02F 1/1368* (2013.01); *G02F 1/13394* (2013.01); *G02F 1/133512* (2013.01); *G02F 1/133514* (2013.01); *G02F 1/134309* (2013.01); *G02F 2001/13606* (2013.01); *G02F 2001/13629* (2013.01); *G02F 2001/13685* (2013.01); *G02F 2201/121* (2013.01); *G02F 2201/123* (2013.01)

(58) Field of Classification Search
CPC ..... G02F 2001/13685; G02F 1/136286; G02F 1/1339; G02F 1/13394; G02F 2001/13398
See application file for complete search history.

(56) References Cited

U.S. PATENT DOCUMENTS

| 2010/0007632 A1* | 1/2010 | Yamazaki ............. G06F 1/1616 345/175 |
| 2011/0291094 A1* | 12/2011 | Cheng ............... G02F 1/134363 257/59 |
| 2013/0155364 A1 | 6/2013 | Dong et al. |
| 2016/0124280 A1 | 5/2016 | Park et al. |

* cited by examiner

*Primary Examiner* — Jessica M Merlin
(74) *Attorney, Agent, or Firm* — Tim Tingkang Xia, Esq.; Locke Lord LLP

(57) ABSTRACT

A display device using low capacitance bus lines having gate lines and data lines on different substrates. The display device includes a first substrate and a second substrate spaced apart from each other, and a liquid crystal layer is disposed in the cell gap between the first substrate and the second substrate. The data lines of the display device are formed on the first substrate, and the gate lines of the display device are formed on the second substrate. The data lines formed on the first substrate and the gate lines formed on the second substrate are spaced apart by a gate insulator layer and the liquid crystal layer, which increases the gap distance between the data lines and the gate lines. Accordingly, a cross capacitance between each of the data lines and each of the gate lines can be reduced.

20 Claims, 20 Drawing Sheets

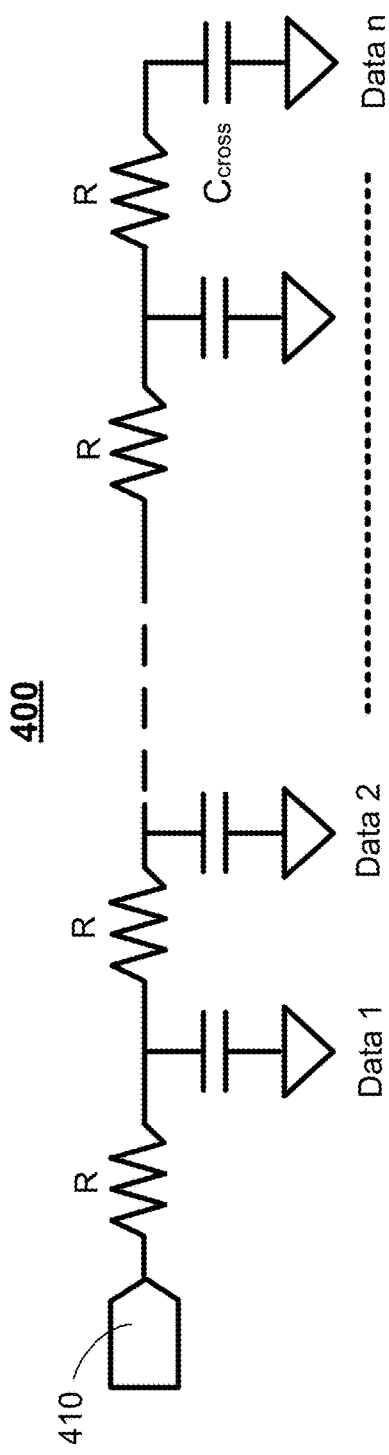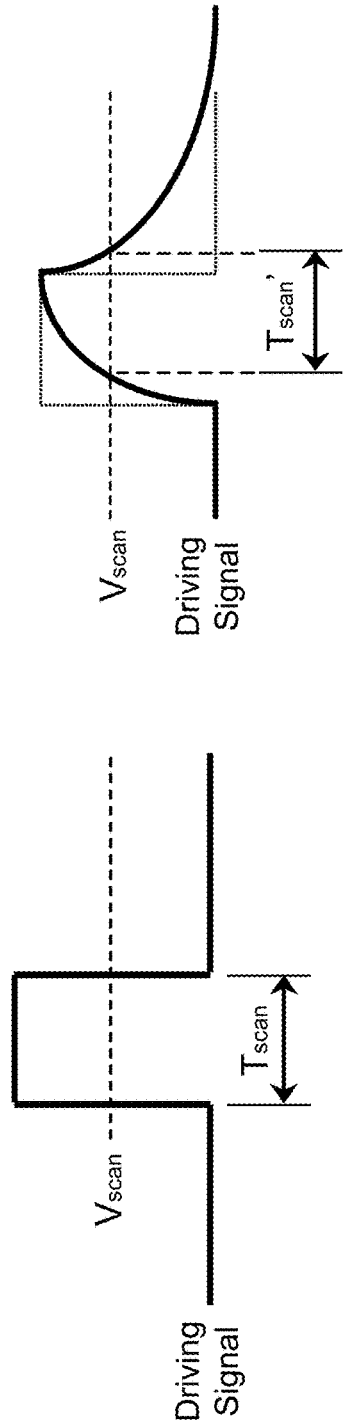

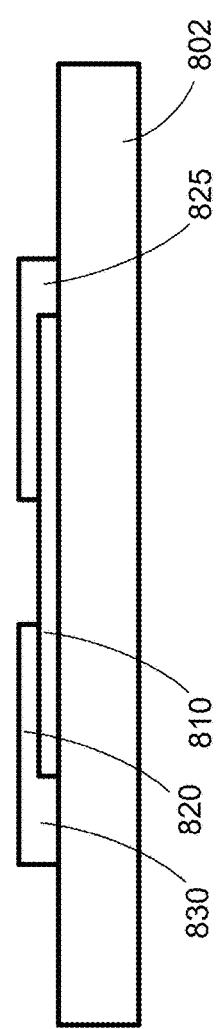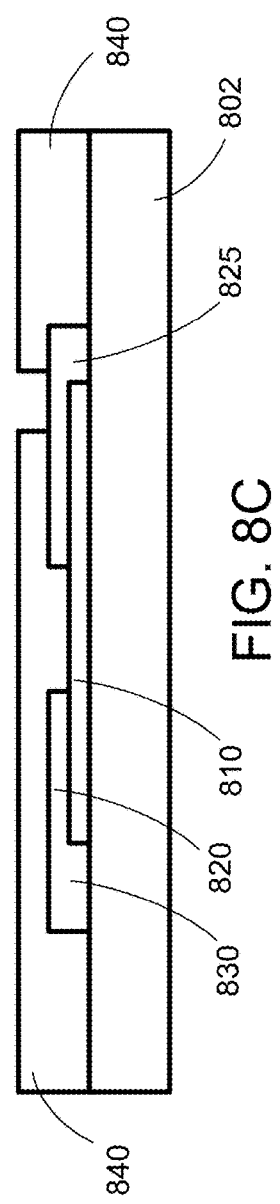

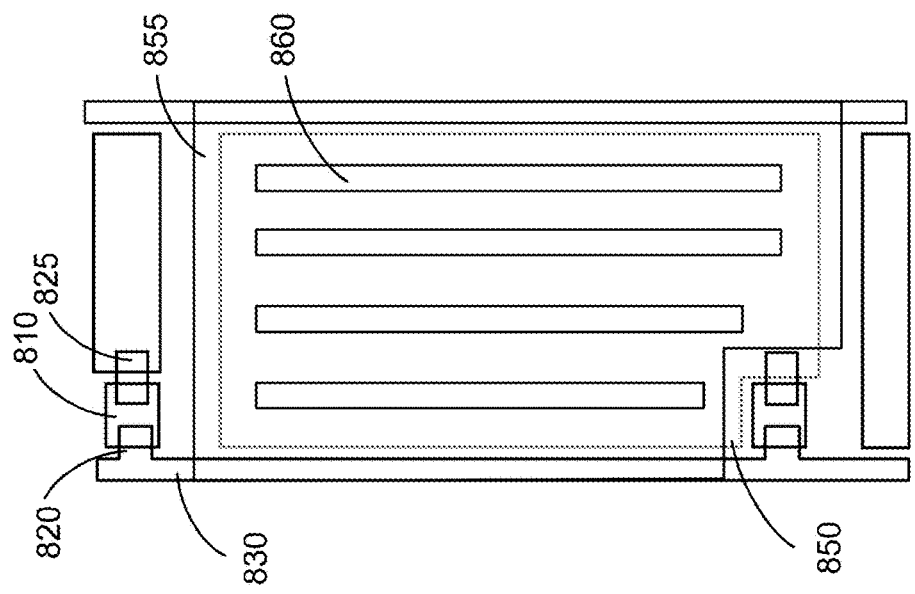
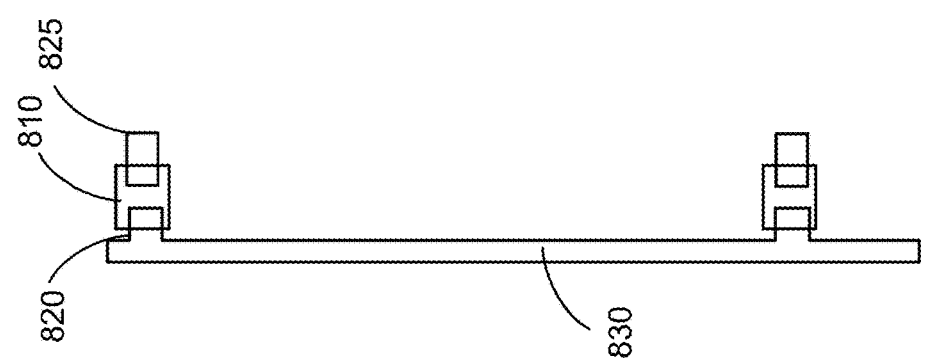

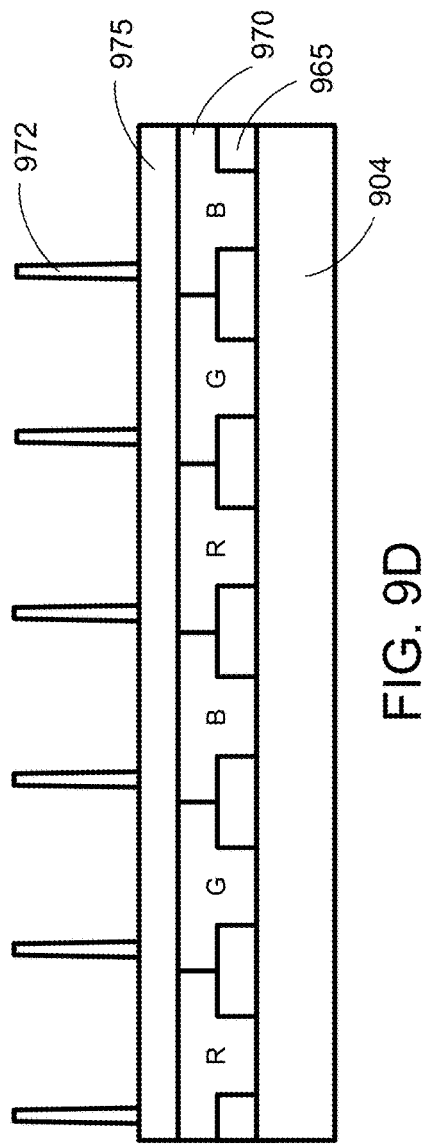
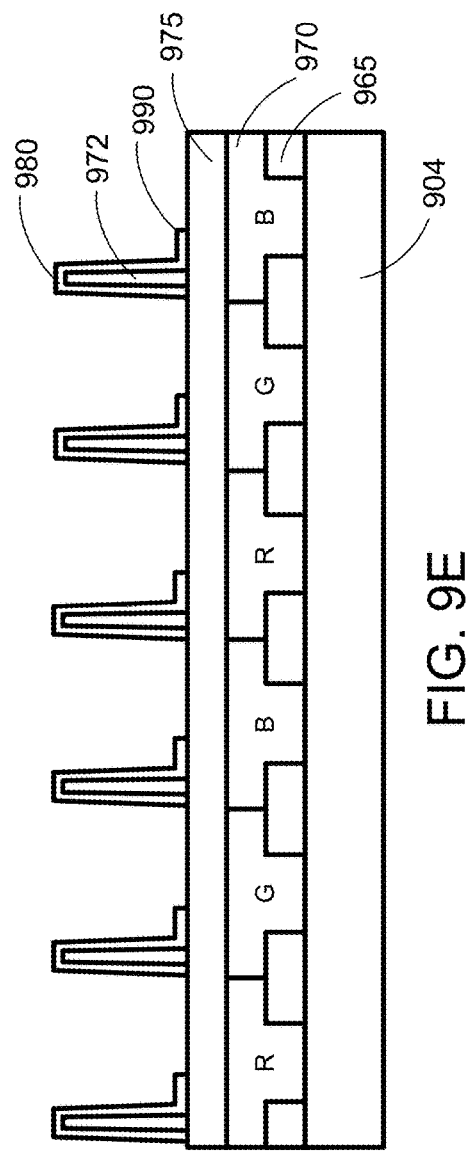
FIG. 9D
FIG. 9E

DISPLAY DEVICE USING LOW CAPACITANCE BUS LINES HAVING GATE LINES AND DATA LINES ON DIFFERENT SUBSTRATES

FIELD

The disclosure relates generally to display technology, and more particularly to a display device having gate lines and data lines on different substrates.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In a high resolution display device, as the size of the display screen becomes larger, line resistance and line capacitance become greater. Accordingly, several problems may occur such as flickering, luminance non-uniformity, cross-talk and image retention.

Therefore, a heretofore unaddressed need exists in the art to address the aforementioned deficiencies and inadequacies.

SUMMARY

One aspect of the disclosure relates to a display device, which includes: a first substrate and a second substrate spaced apart from each other, defining a cell gap therebetween; a liquid crystal layer disposed in the cell gap between the first substrate and the second substrate and having liquid crystal molecules, the liquid crystal layer defining a plurality of pixels; a first structure disposed on the first substrate facing the liquid crystal layer; a second structure disposed on the second substrate facing the liquid crystal layer; and a plurality of gate electrodes. The first structure includes: a semiconductor layer disposed on the first substrate; an electrode layer disposed on the semiconductor layer to form a plurality of data lines, a plurality of source electrodes and a plurality of drain electrodes for the plurality of pixels, wherein in each pixel, the source electrode is electrically connected to a corresponding one of the data lines; a gate insulator layer disposed on the first substrate covering the electrode layer and the semiconductor layer; and a first transparent conductive layer disposed on the gate insulator layer to form a plurality of pixel electrodes for the plurality of pixels, wherein in each pixel, the pixel electrode is electrically connected to the drain electrode. The second structure includes: a plurality of photo spacers disposed on the second substrate and extended toward the first structure; and a plurality of gate lines respectively disposed on the second substrate. Each of the gate electrodes is corresponding to one of the plurality of pixels and disposed on a corresponding photo spacer of the corresponding pixel, directly contacting the gate insulator layer and facing the semiconductor layer of the first structure, wherein in each pixel, the corresponding gate electrode is electrically connected to a corresponding one of the gate lines. In certain embodiments, the data lines of the first structure and the gate lines of the second structure are spaced apart by the gate insulator layer and the liquid crystal layer, such that a cross capacitance between each of the data lines and each of the gate lines is reduced.

In certain embodiments, the second structure further includes: a black matrix layer disposed on the second substrate; and a color filter layer disposed on the second substrate and the black matrix layer, wherein the plurality of photo spacers and the plurality of gate lines are disposed on the color filter layer.

In certain embodiments, the second structure further includes: a black matrix layer disposed on the second substrate, wherein the plurality of photo spacers and the plurality of gate lines are disposed on the black matrix layer; and the first structure further includes: a color filter layer disposed on the first substrate and the semiconductor layer, wherein the electrode layer is disposed on the color filter layer and the semiconductor layer.

In certain embodiments, the first structure further includes: a black matrix layer disposed on the first substrate, wherein the semiconductor layer is disposed on the black matrix layer; and a color filter layer disposed on the semiconductor layer, wherein the electrode layer is disposed on the color filter layer and the semiconductor layer.

In certain embodiments, the first structure further includes: a passivation layer disposed on the first substrate covering the first transparent conductive layer; and a second transparent conductive layer disposed on the passivation layer to form at least one common electrode.

In certain embodiments, each of the gate electrodes is directly formed on the gate insulation layer as a part of the first structure.

In certain embodiments, a width of the gate electrode is about the same as that of a portion of the gate insulator layer covering the semiconductor layer.

In certain embodiments, the liquid crystal molecules of the liquid crystal layer are nematic liquid crystal molecules having a positive or negative dielectric constant.

In certain embodiments, the semiconductor layer is formed by amorphous silicon (a-Si), polycrystalline silicon (p-Si), indium-gallium-zinc-oxide (IGZO) or indium-tin-zinc-oxide (ITZO).

In certain embodiments, the first transparent conductive layer and the second transparent conductive layer are respectively formed by a transparent conductive material, and the transparent conductive material is indium-tin-oxide (ITO) or indium-zinc-oxide (IZO).

In certain embodiments, the data lines of the first structure and the gate lines of the second structure are respectively formed by a conductive material or alloys of the conductive material, and the conductive material is selected from the group consisting of aluminum (Al), chromium (Cr), Molybdenum (Mo), copper (Cu), and any combination thereof.

In certain embodiments, in each pixel, the source electrode and the drain electrode are spaced apart to form a channel gap therebetween, such that the semiconductor layer is exposed in the channel gap, and the gate electrode is positioned to be substantially aligned with the semiconductor layer exposed in the channel gap. In certain embodiments, an overlapping dimension of the gate electrode and the semiconductor layer exposed in the channel gap is greater than an alignment accuracy requirement value of the display device.

In certain embodiments, a thickness of the liquid crystal layer is about 3-4 μm, and a thickness of the gate insulator layer is about 0.3-0.4 μm.

A further aspect of the disclosure relates to a method for forming a display device, which includes: forming a first structure on a first substrate by: disposing a semiconductor layer on a first substrate; disposing an electrode layer on the semiconductor layer to form a plurality of data lines, a plurality of source electrodes and a plurality of drain electrodes for a plurality of pixels of the display device, wherein in each pixel, the source electrode is electrically connected to a corresponding one of the data lines; disposing a gate insulator layer on the first substrate covering the electrode layer and the semiconductor layer; and disposing a first transparent conductive layer on the gate insulator layer to form a plurality of pixel electrodes for the plurality of pixels, wherein in each pixel, the pixel electrode is electrically connected to the drain electrode; forming a second structure on a second substrate by: disposing a plurality of photo spacers on the second substrate; and forming a plurality of gate lines on the second substrate; forming a plurality of gate electrodes on the photo spacers, each of the gate electrodes corresponding to one of the plurality of pixels and disposed on a corresponding photo spacer of the corresponding pixel, wherein in each pixel, the corresponding gate electrode is electrically connected to a corresponding one of the gate lines; positioning the first structure and the second structure to define a cell gap therebetween, wherein each of the gate electrodes is positioned to directly contact the gate insulator layer and face the semiconductor layer of the first structure; and forming a liquid crystal layer having liquid crystal molecules in the cell gap. In certain embodiments, the data lines of the first structure and the gate lines of the second structure are spaced apart by the gate insulator layer and the liquid crystal layer, such that a cross capacitance between each of the data lines and each of the gate lines is reduced.

In a further aspect of the disclosure, a display device is provided. The display device includes: a first substrate and a second substrate spaced apart from each other, defining a cell gap therebetween; a liquid crystal layer disposed in the cell gap between the first substrate and the second substrate and having liquid crystal molecules, the liquid crystal layer defining a plurality of pixels; a plurality of data lines formed on the first substrate and extending along a first planar direction, each electrically connected to a source electrode of a transistor of each of the plurality of pixels; a plurality of gate lines formed on the second substrate and extending along a second planar direction substantially perpendicular to the first planar direction, each electrically connected to a gate electrode of the transistor of each of the plurality of pixels; and a gate driver configured to provide gate signals to the plurality of gate lines. In certain embodiments, the data lines formed on the first substrate and the gate lines formed on the second substrate are spaced apart by a gate insulator layer and the liquid crystal layer along a third direction substantially perpendicular to the first planar direction and the second planar direction, such that a cross capacitance between each of the data lines and each of the gate lines is reduced.

In certain embodiments, the transistor of each of the plurality of pixels includes: the source electrode disposed on the first substrate and a semiconductor layer and electrically connected to a corresponding data line, wherein the semiconductor layer is disposed on the first substrate; a drain electrode disposed on the first substrate and the semiconductor layer; and the gate electrode directly contacting the gate insulator layer and facing a semiconductor layer, wherein the source electrode and the drain electrode are spaced apart to form a channel gap therebetween, such that the semiconductor layer is exposed in the channel gap, and the gate electrode is positioned to be substantially aligned with the semiconductor layer exposed in the channel gap.

In certain embodiments, the display device further includes a plurality of photo spacers disposed on the second substrate and extended toward the first substrate, wherein the gate electrode of the transistor of each of the plurality of pixels is disposed on a corresponding one of the photo spacers.

In certain embodiments, in each pixel, the gate electrode of the transistor is electrically connected to one of the gate lines via an electrical connecting portion disposed on the corresponding photo spacer.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein:

FIG. 4A schematically shows the capacitance and loading effect on a scan line or a data line according to certain embodiments of the present disclosure.

FIG. 4B schematically shows an input waveform for a scan line according to certain embodiments of the present disclosure.

FIG. 4C schematically shows a delayed waveform at end of a scan line according to certain embodiments of the present disclosure.

FIG. 8A schematically shows a semiconductor layer being disposed on a first substrate according to certain embodiments of the present disclosure.

FIG. 8B schematically shows an electrode layer being disposed on the structure of FIG. 8A according to certain embodiments of the present disclosure.

FIG. 8C schematically shows a gate insulation layer being disposed on the structure of FIG. 8B according to certain embodiments of the present disclosure.

FIG. 8G schematically shows a top view of the structure of FIG. 8B according to certain embodiments of the present disclosure.

FIG. 8H schematically shows a top view of the structure of FIG. 8F according to certain embodiments of the present disclosure.

FIG. 9D schematically shows a plurality of photo spacers being disposed on the structure of FIG. 9C according to certain embodiments of the present disclosure.

FIG. 9E schematically shows the gate electrodes and the gate lines being disposed on the structure of FIG. 9D according to certain embodiments of the present disclosure.

DETAILED DESCRIPTION OF THE DISCLOSURE

Figure 1A:
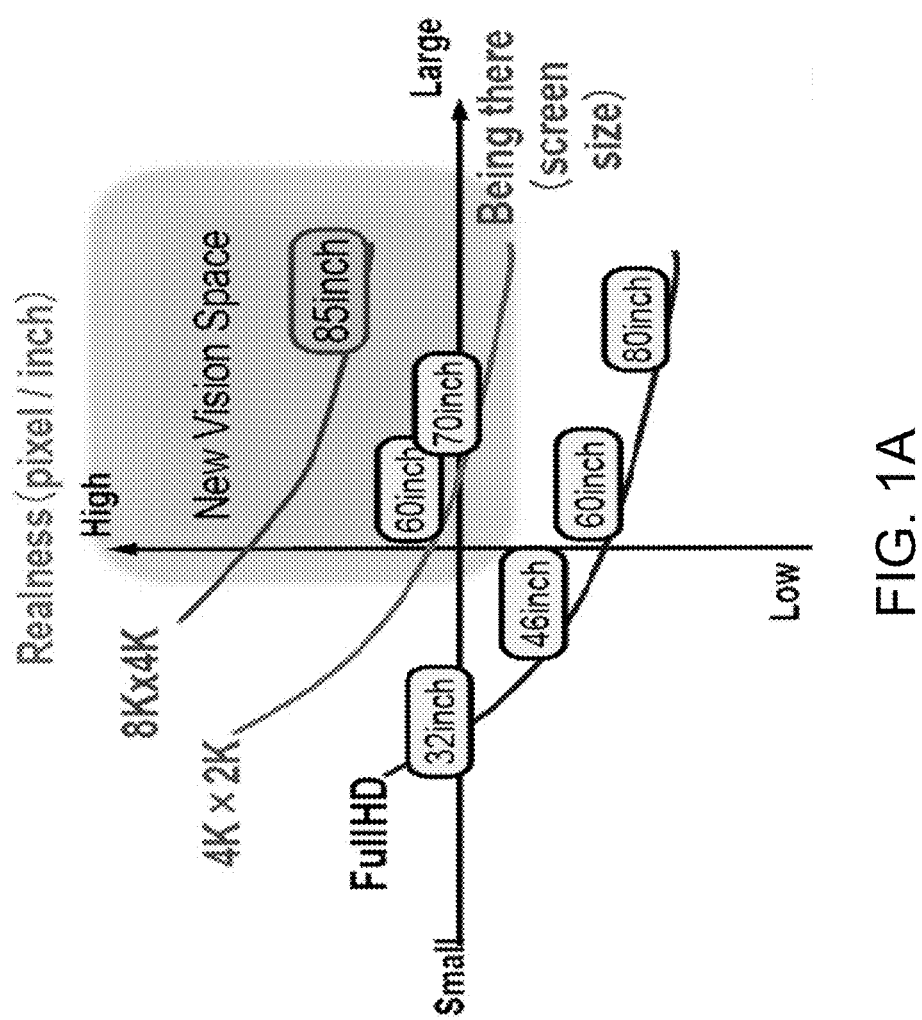
FIG. 1A schematically shows a size to realness comparison chart of the display device according to certain embodiments of the present disclosure.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present disclosure in conjunction with the accompanying drawings. In accordance with the purposes of this disclosure, as embodied and broadly described herein, this disclosure, in certain aspects, relates to a display device using low capacitance bus lines having gate lines and data lines on different substrates.

Figure 1B:
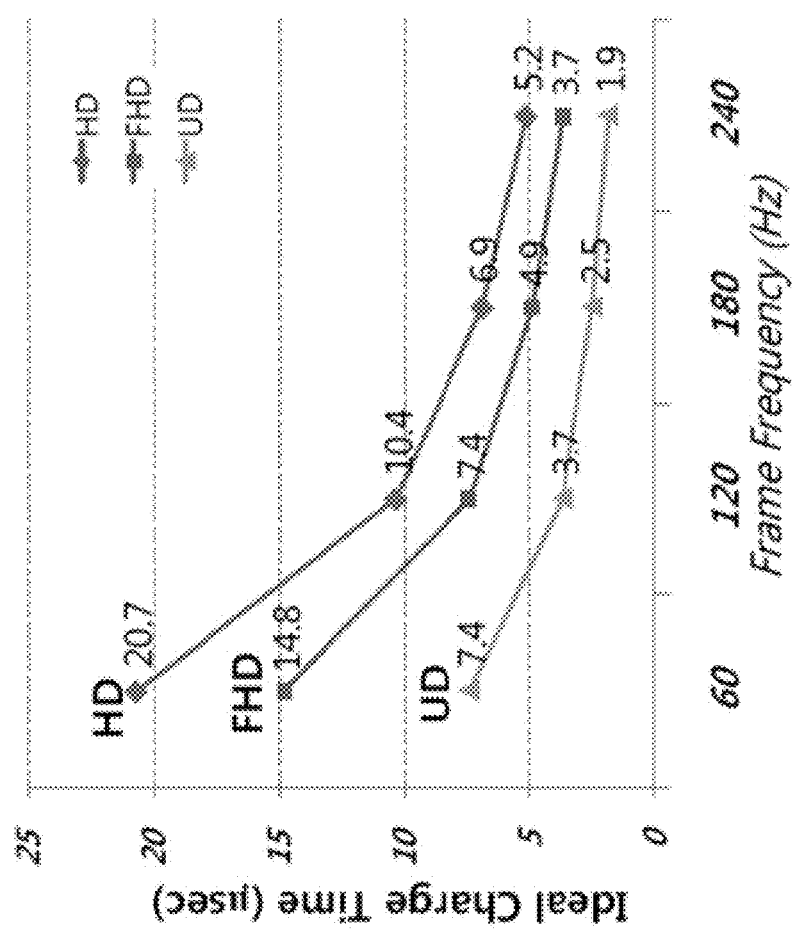
FIG. 1B schematically shows a frame frequency to ideal charge time diagram according to certain embodiments of the present disclosure.

As disclosed above, there is a trend in the high resolution display device field to increase the size of the display screen, and new technology for driving the pixels of the display device have been proposed. For example, FIG. 1A schematically shows a size to realness comparison chart of the display device according to certain embodiments of the present disclosure. As shown in FIG. 1A, a "new vision space" is provided by the display device using the 8K×4K format, and the screen size of the display device may reach 85 inches. Currently there is a new challenge for a new drive technology at a frame rate of 120 Hz in the 8K×4K format. Further, a challenging issue appears to be the lack of charging time allowed for applying video data to each pixel. FIG. 1B schematically shows a frame frequency to ideal charge time diagram according to certain embodiments of the present disclosure. As shown in FIG. 1B, the ideal charge time decreases when the frame frequency increases. For high-definition (HD) display devices, a frame frequency of 120 Hz may lead to an ideal charge time of 10.4 µsec. This ideal charge time for the frame frequency of 120 Hz is further reduced to 7.4 µsec for full HD (FHD) display devices, and to 3.7 µsec for ultra-definition (UD) display devices. This may require fundamental improvements in the resistor-capacitor (RC) delay and turn-on capability of the thin-film transistors (TFT) used in the display device.

Figure 2:
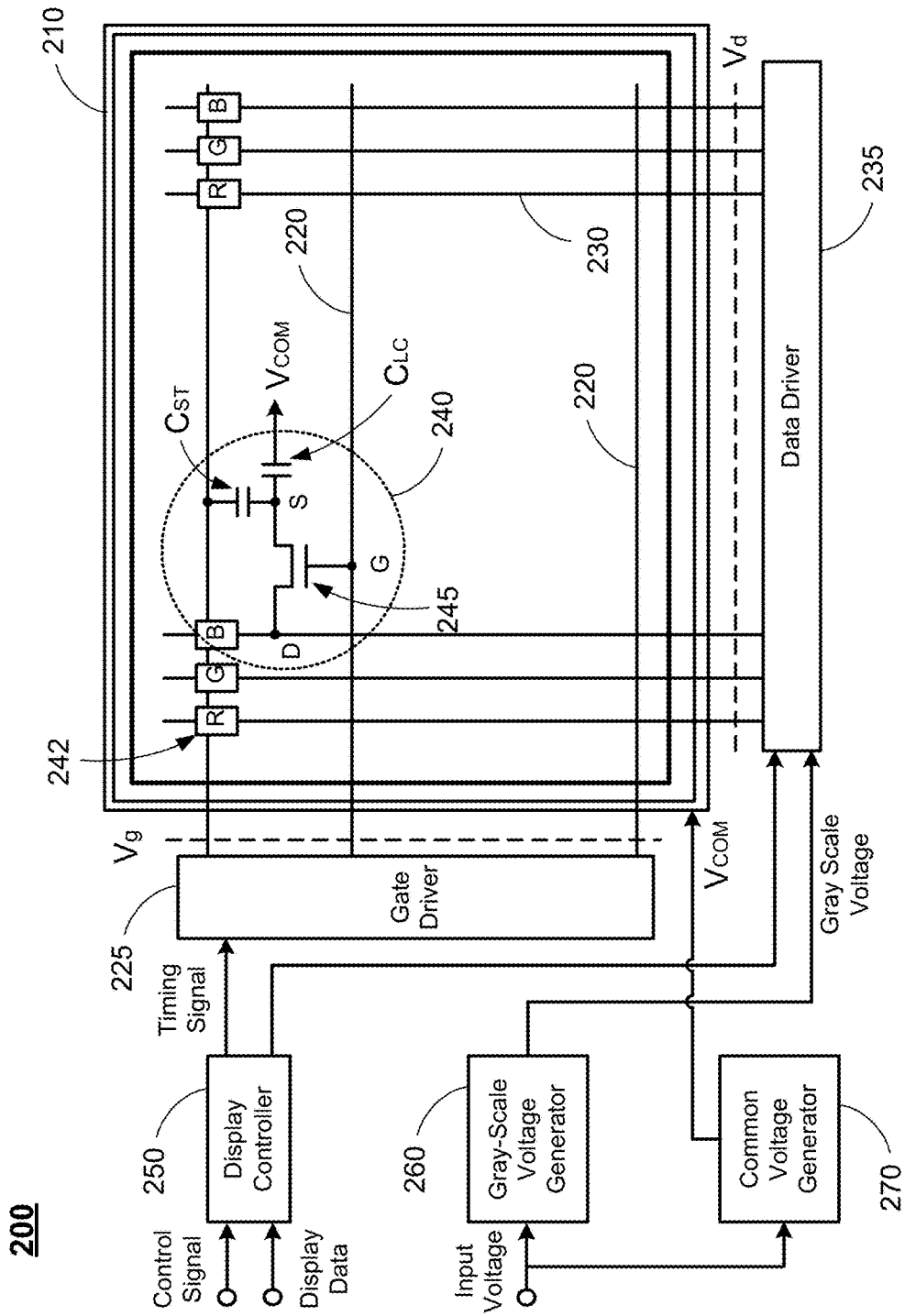
FIG. 2 schematically shows an active matrix design of a display device according to certain embodiments of the present disclosure.

In certain embodiments, an active matrix system may be used in a display device having pixel electrodes arranged in a matrix on a glass substrate, and the pixel electrodes are used to independently drive liquid crystals. Such an active matrix system has often been employed especially in large-sized display with high-density. For example, FIG. 2 schematically shows an active matrix design of a display device according to certain embodiments of the present disclosure. As shown in FIG. 2, the active matrix system includes a display panel 210, which includes a plurality of gate lines 220 and a plurality of data lines (also referred to as source lines) 230. A plurality of pixels 240 may be defined at the crossing of the gate lines 220 and the data lines 230. For example, FIG. 2 shows one pixel 240 having a plurality of RGB sub-pixels 242, each being driven by a TFT 245. Specifically, the transistor 245 has a source S, a drain D and a gate G. A gate driver 225 is connected to the gate lines 220 to provide gate signals (e.g., a gate driving voltage Vg) to the gate G of the pixels 240, and a data driver 235 is connected to the data lines 230 to provide data signals (e.g., a data voltage Vd) to the source/drain of the pixels 240. Further, the display device 200 has a display controller 250, a gray-scale voltage generator 260 and a common voltage generator 270. The display controller 250 receives control signals and display data, and generates timing signals for the gate driver 225 and the data driver 235. The gray-scale voltage generator 260 receives input voltages and generates gray scale voltages for the data driver 235. The common voltage generator 270 receives the input voltages and generates common voltages $V_{COM}$ for the display panel 210.

Figure 3:
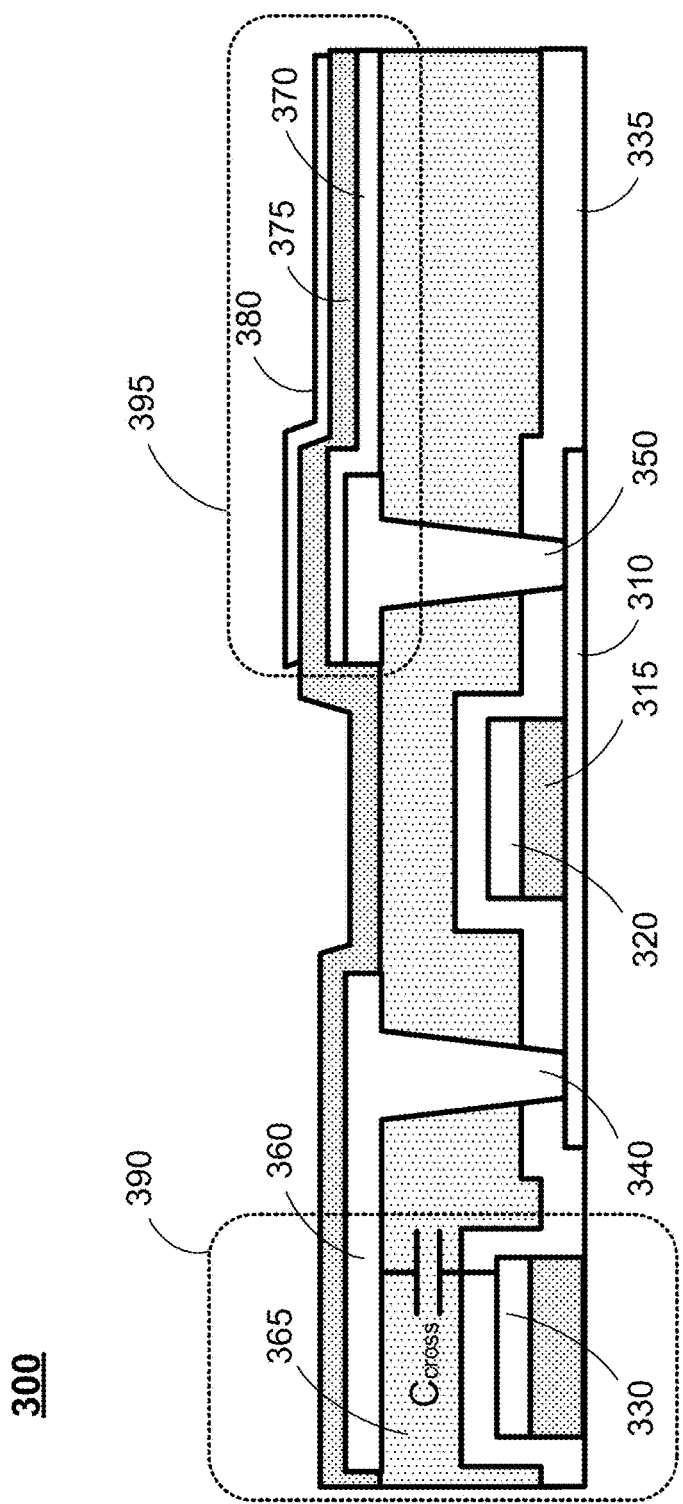
FIG. 3 schematically shows a self-aligned top-gate oxide TFT structure of a display device according to certain embodiments of the present disclosure.

As shown in FIG. 2, the capacitances in a pixel 240 may include, among other things, a storage capacitance $C_{ST}$ and a liquid crystal (LC) capacitance $C_{LC}$. FIG. 3 schematically shows a self-aligned top-gate oxide TFT structure of a display device according to certain embodiments of the present disclosure. As shown in FIG. 3, the structure 300 includes an oxide semiconductor layer 310, which functions as a channel layer. A gate insulator layer 315 is disposed on the oxide semiconductor layer 310, and a gate electrode 320 is formed on the gate insulator layer 315. Further, a gate line 330, which is disposed on the left side of the structure 300, is electrically connected (not shown) to the gate electrode 320. A passivation layer 335 is formed to cover the bottom parts of the structure 300, including the oxide semiconductor layer 310, the gate electrode 320, and the gate line 330. Further, a source electrode 340 and a drain electrode 350 are respectively formed on the oxide semiconductor layer 310. The source electrode 340 is electrically connected to a data line (i.e., the source line) 360, and a low-K insulator layer 365 (K being the dielectric constant of the material of the insulator layer) is formed between the data line 360 and the gate line 330. Moreover, a pixel electrode 370, which may be formed by indium-tin-oxide (ITO), is formed to be electrically connected to the drain electrode 350, and a high-K insulator layer 375 (K being the dielectric constant) is disposed thereon. A common electrode 380, which may also be formed by ITO, is disposed on the high-K insulator layer 375. In certain embodiments, when both the pixel electrode 370 and the common electrode 380 are formed by ITO, the pixel electrode 370 may be referred to as the ITO1 layer, and the common electrode 380 may be referred to as the ITO2 layer. In this case, the low-K insulator layer 365 is used at a crossover area 390 between the data line 360 and the gate line 330, where a crossover capacitance Ccross may be generated. On the other hand, the high-K insulator layer 375 is used at a storage capacitor area 395 between the two ITO layers (i.e., the pixel electrode layer 370 and the common electrode layer 380) to provide a storage capacitance $C_{ST}$.

However, as the display screen becomes larger, line resistance and line capacitance become greater. FIG. 4A schematically shows the capacitance and loading effect on a scan line or a data line according to certain embodiments of the present disclosure. As shown in FIG. 4A, in a scan line 400, a resistance R and a crossover capacitance Ccross may be generated in each of the sections between the scan bonding lead 410 and each of the data output terminals. This loading effect also occurs for a data line.

FIG. 4B schematically shows an input waveform for a scan line according to certain embodiments of the present disclosure, and FIG. 4C schematically shows a delayed waveform at end of a scan line according to certain embodiments of the present disclosure. In operation, the driving signal for a scan line must pass a voltage threshold Vscan to perform the scanning. As shown in FIG. 4B, when the scanning process starts, ideally, the driving signal would rise up to a level higher than the voltage threshold Vscan and sustain at the level for an ideal scan period Tscan. However, as shown in FIG. 4C, the driving signal at the end of the scan line would require a longer rise time to reach the voltage threshold Vscan. In certain embodiments, the rise time would be greater than one-tenth of the ideal scan period Tscan, which causes a scan line delay at the end of the scan line. Although a delay also occurs at the end of the scanning process, the rise time is generally greater than the drop time, thus resulting in the actual scan period Tscan' being shorter than the ideal scan period Tscan. Such a scan line delay problem may further result in several problems, such as flickering, luminance non-uniformity, cross-talk, and image retention.

In order to avoid the above-mentioned problems, certain aspects of the disclosure relate to a display device, which uses low capacitance bus lines having gate lines and data lines on different substrates. In certain embodiments, the display device may include a first substrate and a second substrate spaced apart from each other, defining a cell gap therebetween. A liquid crystal layer is disposed in the cell gap between the first substrate and the second substrate. A plurality of data lines may be formed on the first substrate, each electrically connected to a source electrode of a transistor of each of the plurality of pixels. Further, a plurality of gate lines may be formed on the second substrate, each electrically connected to a gate electrode of the transistor of each of the plurality of pixels. In this case, since the data lines and the gate lines are formed on different substrates, the data lines and the gate lines are spaced apart not only by a gate insulator layer, but also by the liquid crystal layer. Thus, the distance between the data lines and the gate lines is increased, such that a cross capacitance between each of the data lines and each of the gate lines can be reduced.

Figure 5:
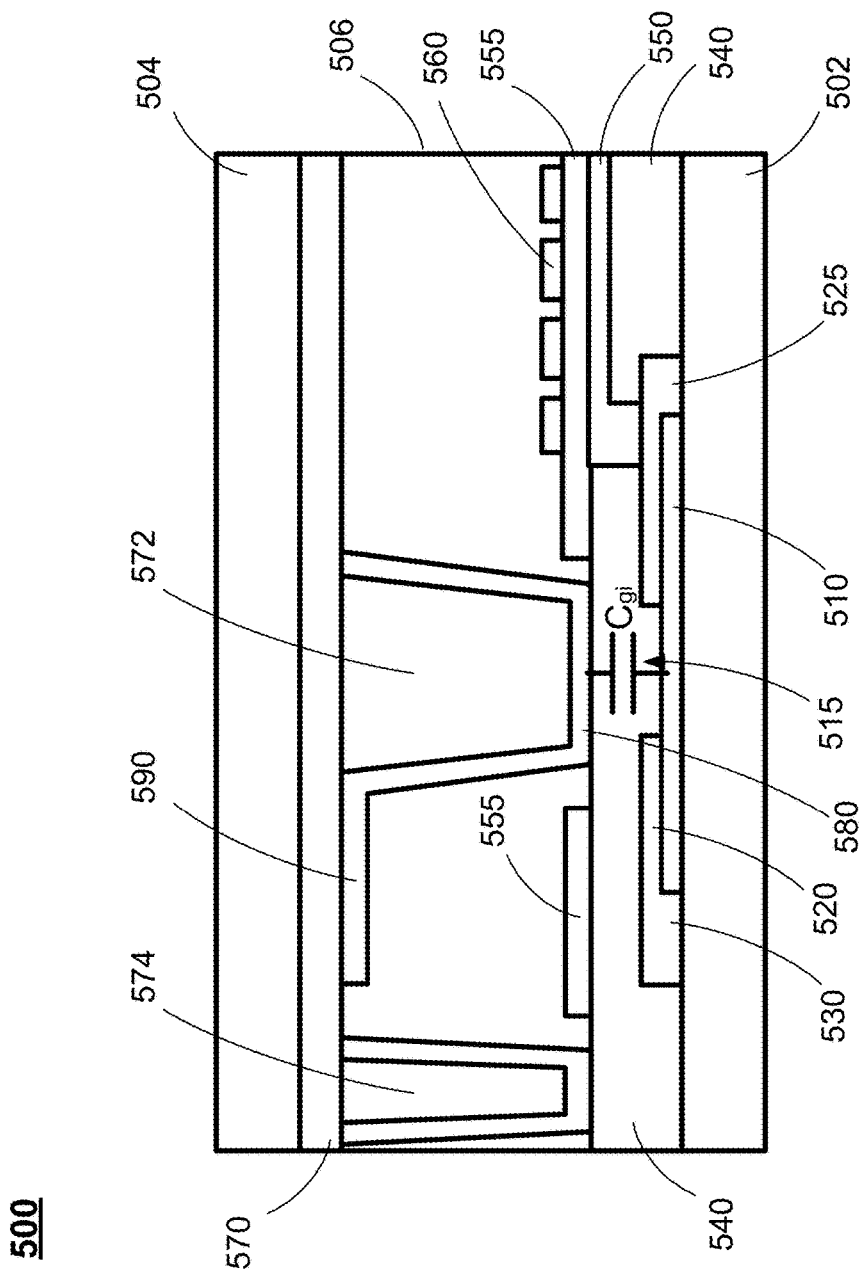
FIG. 5 schematically shows a cross-sectional view of a display device according to certain embodiments of the present disclosure.

FIG. 5 schematically shows a cross-sectional view of a display device according to certain embodiments of the present disclosure. In particular, the display device 500 as shown in FIG. 5 refers to a cross-section of a pixel structure. As shown in FIG. 5, the display device 500 has two substrates spaced apart from each other, including a first substrate 502 and a second substrate 504, thus defining a cell gap between the first substrate 502 and the second substrate 504. A liquid crystal layer 506 may be formed within the cell gap sandwiched between the first substrate 502 and the second substrate 504. The liquid crystal layer 506 is formed by liquid crystal molecules (not shown). In certain embodiments, the liquid crystal molecules of the liquid crystal layer 506 may be nematic liquid crystal molecules having a positive or negative dielectric constant. Moreover, a first structure, which includes multiple components, is disposed on the first substrate 502, and a corresponding second structure, which also includes multiple components, is formed on the second substrate 504, both facing the liquid crystal layer 506. Details of the first and second structures will be further elaborated as below.

Regarding the first structure disposed on the first substrate 502, as shown along an upward direction in FIG. 5, a semiconductor layer 510 is disposed on the first substrate 502, serving as a channel layer. In certain embodiments, the semiconductor layer 510 may be formed by amorphous silicon (a-Si), polycrystalline silicon (p-Si), indium-gallium-zinc-oxide (IGZO) or indium-tin-zinc-oxide (ITZO). Then, a source electrode 520 is disposed on the semiconductor layer 510 and the first substrate 502, and a drain electrode 525 is disposed on the semiconductor layer 510, where the source electrode 520 and the drain electrode 525 are spaced apart to form a channel gap 515 therebetween, such that the semiconductor layer 510 is exposed in the channel gap 515. Further, a part of the source electrode 520 on the left side of FIG. 5 constitutes the data line 530, such that the source electrode 520 is electrically connected to the data line 530. In certain embodiments, the source electrode 520, the drain electrode 525 and the data line 530 may be formed altogether as an electrode layer disposed on the first substrate 502 and the semiconductor layer 510. In certain embodiments, the electrode layer (i.e., the source electrode 520, the drain electrode 525 and the data line 530) may be formed by one or more conductive materials, which may be aluminum (Al), chromium (Cr), Molybdenum (Mo), copper (Cu), or other conductive materials. In certain embodiments, the conductive materials may include alloys of Al, Cr, Mo and/or Cu, or any combination of Al, Cr, Mo, Cu and/or their alloys, as well as other conductive materials.

Then, a gate insulator layer 540, which may be a dielectric layer, is disposed on the first substrate 502 to cover the semiconductor layer 510 and the electrode layer (i.e., the source electrode 520, the drain electrode 525 and the data line 530). A pixel electrode 550 is then disposed on the gate insulator layer 540, and is electrically connected to the drain electrode 525. In certain embodiments, the pixel electrode 550 may be formed as a first transparent conductive layer (such as an ITO layer), which may be formed by a transparent conductive material. For example, the transparent conductive material may be ITO or indium-zinc-oxide (IZO), which may be formed by sputtering. On top of these structures, a passivation layer 555 is blanketly formed overlying the first substrate 502, thus covering the pixel electrode 550 (i.e., the first transparent conductive layer) and other structures, such as the gate insulator layer 540. Then, a plurality of common electrodes 560 may be disposed on passivation layer 555. In certain embodiments, the common electrodes 560 may be formed as a second transparent conductive layer (such as an ITO layer), which may also be formed by a transparent conductive material. For example, the transparent conductive material may be ITO or IZO, which may be formed by sputtering. In certain embodiments, the pixel electrode 550 and the common electrodes 560 (i.e., the first and second transparent conductive layers) may be formed by the same transparent conductive material. Alternatively, in certain embodiments, the pixel electrode 550 and the common electrodes 560 may be respectively formed by different types of transparent conductive materials.

Regarding the second structure disposed on the second substrate 504, as shown along a downward direction in FIG. 5, a color filter layer 570 is disposed on the second substrate 504. In certain embodiments, a black matrix layer (not shown in FIG. 5) may be formed on the second substrate 504, and then the color filter layer 570 is disposed on the second substrate 504 as well as the black matrix layer. In certain embodiments, an overcoat layer (not shown in FIG. 5) may be formed on the second substrate 504 to cover the color filter layer 570 (as well as the black matrix layer). Then, a plurality of photo spacers (PS's) 572 and 574 may be formed on the color filter layer 570 (or, in the case where an overcoat layer exists, on the overcoat layer), where each of the photo spacers 572 and 574 is extended toward the gate insulator layer 540 of the first structure. At the bottom of the photo spacer 572, a gate electrode 580 is formed to directly contact the gate insulator layer 540, such that the gate electrode directly faces the semiconductor layer 510 exposed in the channel gap 515. Further, a gate line 590 is disposed on the color filter layer 570 and the photo spacer 572, such that the gate electrode 580 is electrically connected to the gate line 590. In certain embodiments, the gate electrode 580 is electrically connected to the gate line 590 via an electrical connecting portion (i.e., the portion disposed on the slant surface of the photo spacer 572). In certain embodiments, the gate electrode 580 and/or the gate line 590 may be formed by one or more conductive materials, which may be Al, Cr, Mo and/or Cu, or other conductive materials. In certain embodiments, the conductive materials may include alloys of Al, Cr, Mo and/or Cu, or any combination of Al, Cr, Mo, Cu and/or their alloys, as well as other conductive materials. In certain embodiments, the conductive materials being used for the gate electrode 580 and/or the gate line 590 may be the same conductive materials to form the electrode layer (i.e., the source electrode 520, the drain electrode 525 and the data line 530). Alternatively, in certain embodiments, the conductive materials being used for the gate electrode 580 and/or the gate line 590 may be different from the conductive materials to form the electrode layer.

In certain embodiments, the gate electrode 580 is positioned to be substantially aligned with the semiconductor layer 510 exposed in the channel gap 515, such that a capacitance Cgi of the gate insulator layer 540 between the gate electrode 580 and the semiconductor layer 510 is generated. In certain embodiments, the width of the gate electrode 580 may be determined accordingly such that an overlapping dimension of the gate electrode 580 and the semiconductor layer 510 exposed in the channel gap 515 may be greater than an alignment accuracy requirement value of the cell assembly of the display device 500.

Figure 6:
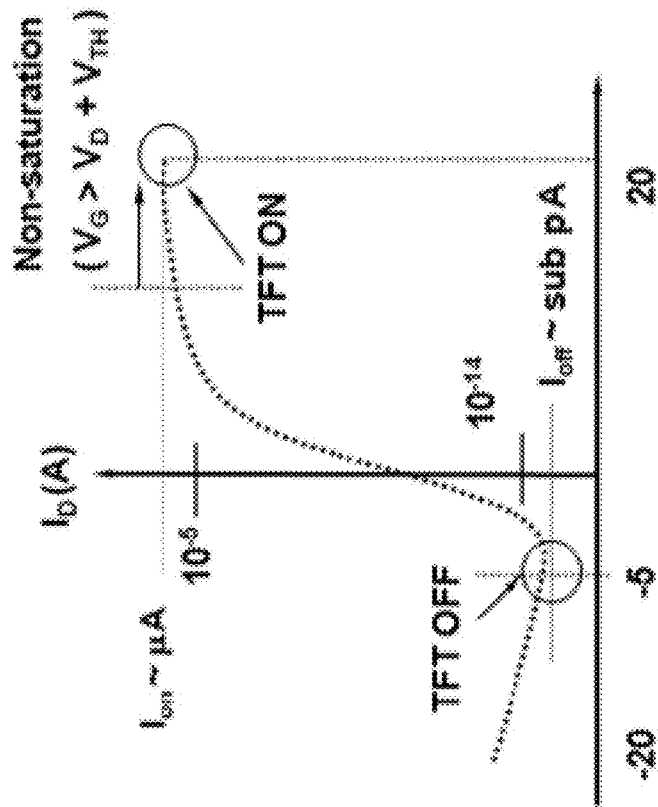
FIG. 6 shows a curve of gate voltage Vg versus current Id of the TFT according to certain embodiments of the present disclosure.

FIG. 6 shows a diagram of the turning on process of the TFT according to certain embodiments of the present disclosure. When a voltage $V_G$ applied to a gate of the TFT exceeds a threshold voltage $V_{TH}$, a drain and a source are conductive and a current $I_{DS}$ is flown therebetween. In particular, to turn on/off a TFT, the gate driving voltage should follow the following formulas:

$$(V_G > V_D + V_{TH}) I_{DS} = K\{2(V_G - V_{TH}) - V_D\} V_D \quad (1)$$

$$K = (\tfrac{1}{2}) * \mu eff \times Cg \times (W/L) \quad (2)$$

where $V_D$ is the to each pixel via the data line applied voltage, $V_{TH}$ is the threshold voltage of the TFT, $V_G$ is the gate voltage of the TFT, $I_{DS}$ is a current stream for displaying an image by each pixel, K is a current gain value, W is the width of the TFT channel and L is the length of the TFT channel. Also, µeff is the mobility of charge, and Cg is a parasitic capacitance, as in the overlapping portions between the gate electrode and the source electrode as well as the gate electrode and the drain electrode is generated. If $I_{DS}$ increases, the image quality is improved.

Referring back to FIG. 5, the data line 530 is a part of the first structure, which is formed on the first substrate 502, and the gate line 590 is a part of the second structure, which is formed on the second substrate 504. Thus, the data line 530 and the gate line 590 are spaced apart by multiple structures, including, among other things, the gate insulator layer 540 and the liquid crystal layer 506, such that a large gap distance is formed therebetween.

Figure 7A:
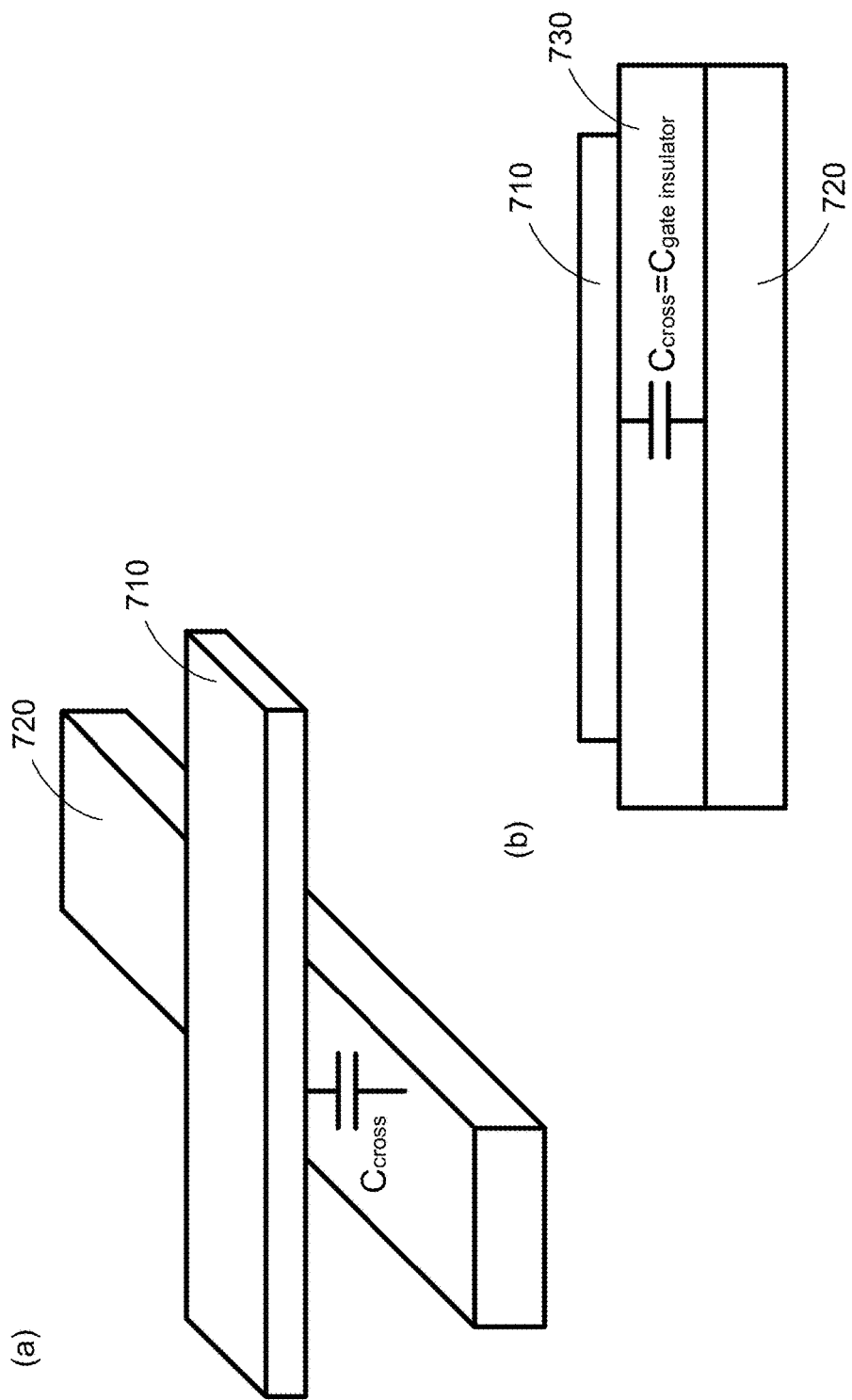
FIG. 7A schematically shows (a) a perspective view and (b) a cross-sectional view of a gate line and a data line spaced apart by only a gate insulator layer according to certain embodiments of the present disclosure.
Figure 7B:
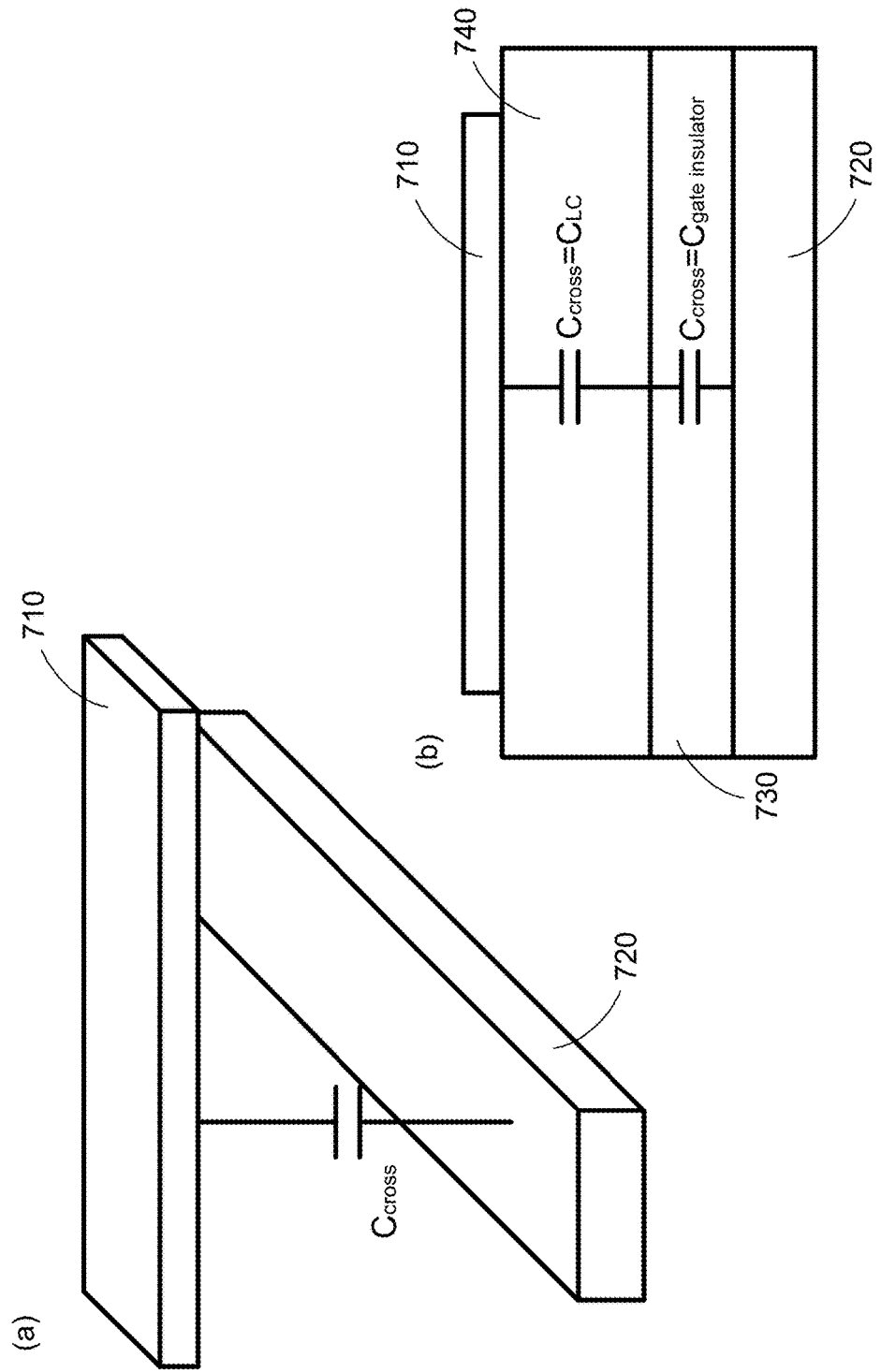
FIG. 7B schematically shows (a) a perspective view and (b) a cross-sectional view of a gate line and a data line spaced apart by a liquid crystal layer and a gate insulator layer according to certain embodiments of the present disclosure.

FIG. 7A schematically shows (a) a perspective view and (b) a cross-sectional view of a gate line and a data line spaced apart by only a gate insulator layer according to certain embodiments of the present disclosure. In comparison, FIG. 7B schematically shows (a) a perspective view and (b) a cross-sectional view of a gate line and a data line spaced apart by a liquid crystal layer and a gate insulator layer according to certain embodiments of the present disclosure. In particular, as shown in FIGS. 7A and 7B, for each layer between the gate line 710 and the data line 720, the capacitance C is:

$$C = \varepsilon \frac{s}{d} \quad (3)$$

where ε is the permittivity, s is the overlapping area of the layer, and d is the distance formed by the layer.

Thus, when the gate line 710 and the data line 720 are spaced apart by a gate insulator layer 730 only, as shown in FIG. 7A, the cross capacitance Ccross will be greater because the distance is the thickness of the gate insulator layer 730. In comparison, when the gate line 710 and the data line 720 are spaced apart by a liquid crystal layer and a gate insulator layer 730 and a liquid crystal layer 740, as shown in FIG. 7B, the cross capacitance Ccross will be significantly reduced because the distance is increased with the addition of the thickness of the liquid crystal layer 740 to the thickness of the gate insulator layer 730. Generally, the thickness of liquid crystal layer 740 is also significantly greater than the thickness of the gate insulator layer 730. In certain embodiments, a thickness of the liquid crystal layer 506 may be about 3-4 µm, whereas a thickness of the gate insulator layer 540 is generally about 0.3-0.4 µm. Accordingly, the cross capacitance Ccross between the data line 530 and the gate line 590 may be reduced.

Figure 8D:
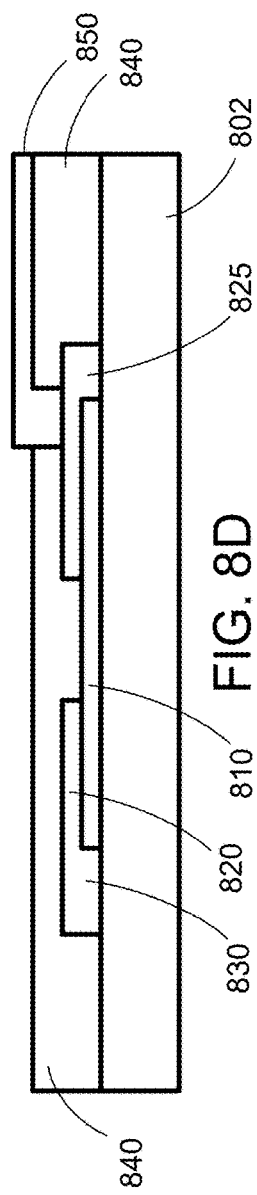
FIG. 8D schematically shows a pixel electrode being disposed on the structure of FIG. 8C according to certain embodiments of the present disclosure.
Figure 8E:
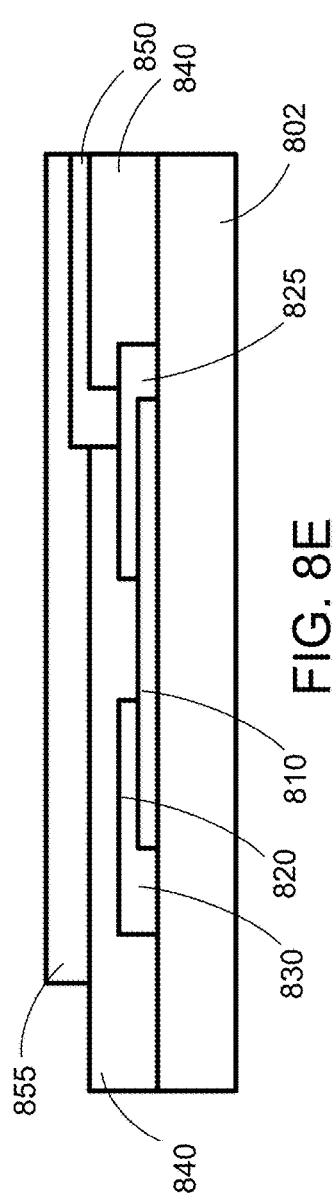
FIG. 8E schematically shows a passivation layer being disposed on the structure of FIG. 8D according to certain embodiments of the present disclosure.
Figure 8F:
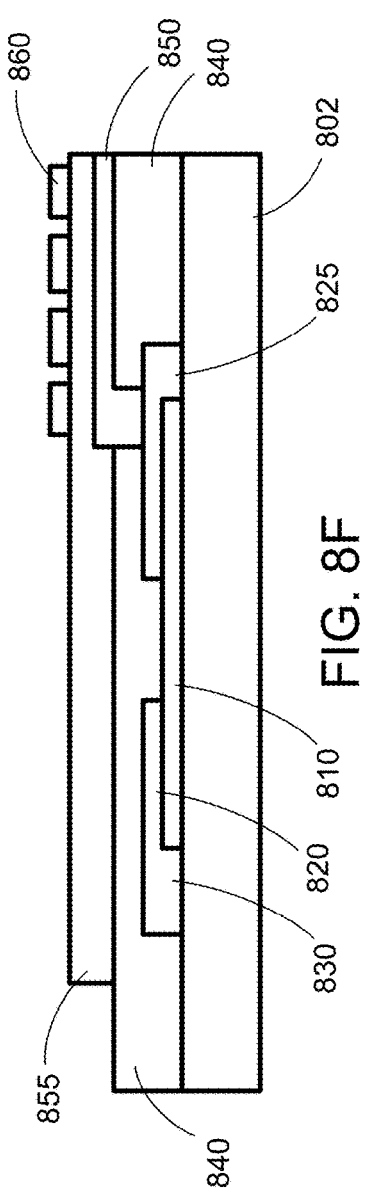
FIG. 8F schematically shows a plurality of common electrodes being disposed on the structure of FIG. 8E according to certain embodiments of the present disclosure.

FIGS. 8A-8H schematically show a process of forming the first structure of the display device on the first substrate 502 as shown in FIG. 5, where FIGS. 8A-8F show a process of deposition of the layers of the first structure, FIG. 8G shows a top view of the structure of FIG. 8B, and FIG. 8H shows a top view of the structure of FIG. 8F. As shown in FIG. 8A, the semiconductor layer 810 is disposed on the first substrate 802. Then, an electrode layer, which includes the source electrode 820, the drain electrode 825, and the data line 830, may be disposed on the semiconductor layer 810 and the first substrate 802, as shown in FIG. 8B. A top view of the structure of FIG. 8B is shown in FIG. 8G. Then, the gate insulation layer 840 is disposed on the first substrate 802 covering the electrode layer (i.e., the source electrode 820, the drain electrode 825, and the data line 830) and the semiconductor layer 810, as shown in FIG. 8C. It should be noted that a cavity is formed between the two portions of the gate insulation layer 840 for the pixel electrode 850. As shown in FIG. 8D, the pixel electrode 850 (i.e., the first transparent conductive layer) is disposed on the gate insulator layer 840 to be electrically connected to the drain electrode 825. Then, a passivation layer 855 is blanketly formed overlying the first substrate 802, thus covering the pixel electrode 850 (i.e., the first transparent conductive layer) and other structures, such as the gate insulator layer 840, as shown in FIG. 8E. Finally, as shown in FIG. 8F, a plurality of common electrodes 860 may be disposed on passivation layer 855. A top view of the structure of FIG. 8F is shown in FIG. 8H (without showing the gate insulation layer 840).

Figure 9A:
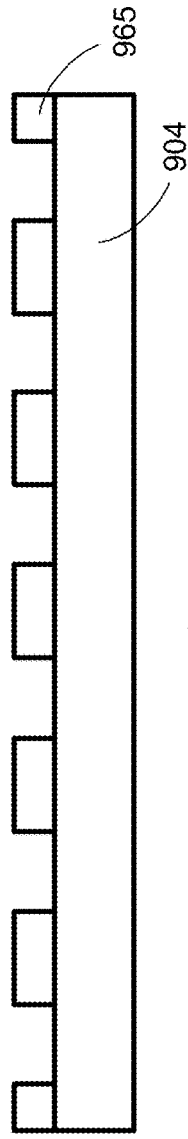
FIG. 9A schematically shows a black matrix layer being disposed on a second substrate according to certain embodiments of the present disclosure.
Figure 9B:
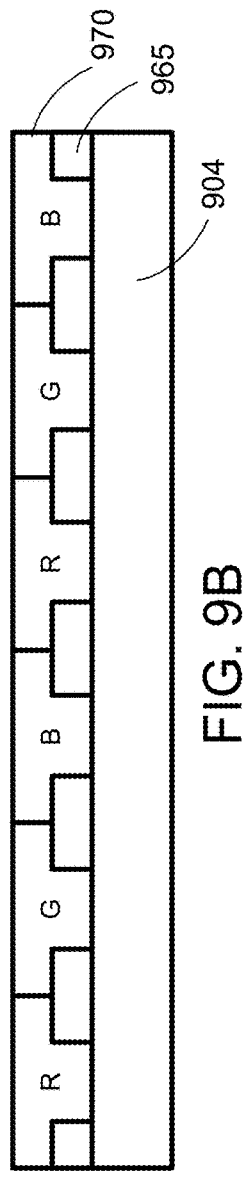
FIG. 9B schematically shows a color filter layer being disposed on the structure of FIG. 9A according to certain embodiments of the present disclosure.
Figure 9C:
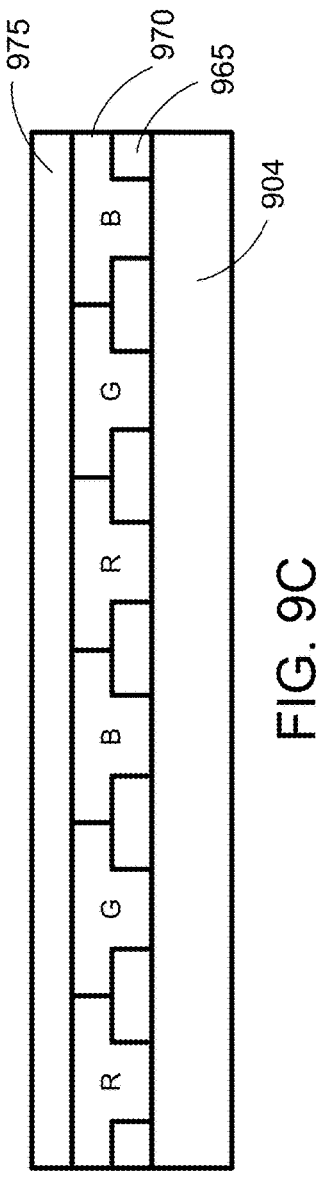
FIG. 9C schematically shows an overcoat layer being disposed on the structure of FIG. 9B according to certain embodiments of the present disclosure.
Figure 9G:
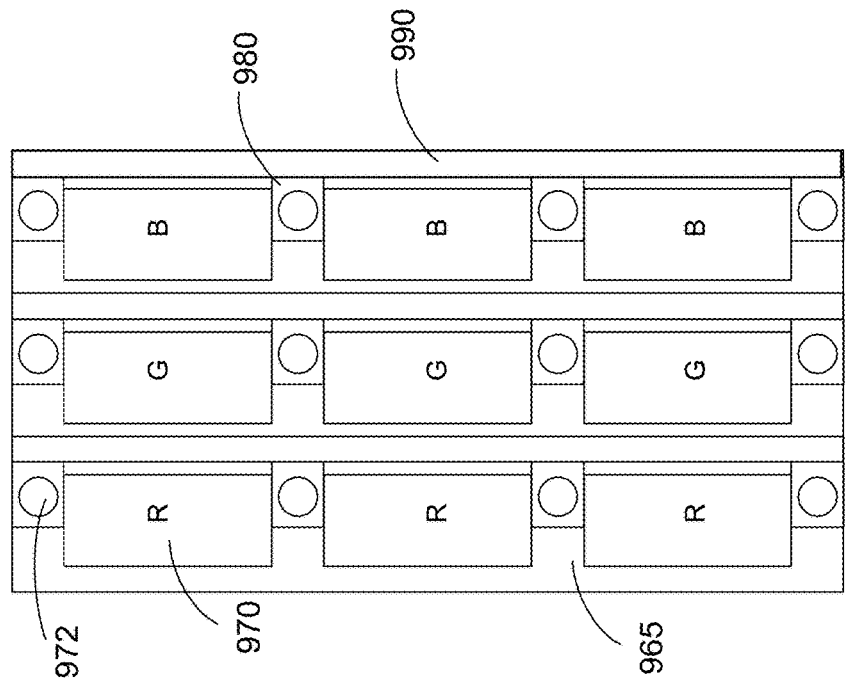
FIG. 9G schematically shows a top view of the structure of FIG. 9E according to certain embodiments of the present disclosure.
Figure 9F:
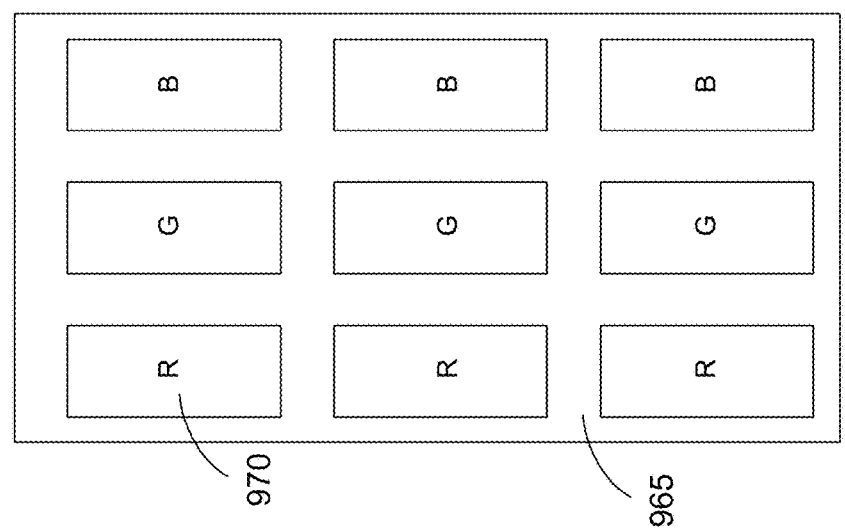
FIG. 9F schematically shows a top view of the structure of FIG. 9B according to certain embodiments of the present disclosure.

FIGS. 9A-9G schematically show a process of forming the second structure of the display device on the second substrate 504 as shown in FIG. 5, where FIGS. 9A-9E show a process of deposition of the layers of the second structure, FIG. 9F shows a top view of the structure of FIG. 9B, and FIG. 9G shows a top view of the structure of FIG. 9E. As shown in FIG. 9A, the black matrix layer 965 is disposed on the second substrate 904. Then, the color filter layer 970, which includes the color filters R, G and B, may be disposed on the black matrix layer 965 and the second substrate 904, as shown in FIG. 9B. A top view of the structure of FIG. 9B is shown in FIG. 9F. Then, an overcoat layer 975 is disposed on the second substrate 904 covering the black matrix layer 965 and the color filter layer 970, as shown in FIG. 9C. As shown in FIG. 8D, the photo spacers 972 are then formed on the overcoat layer 975. Then, the gate electrodes 980 are formed on the photo spacers 972, and the gate lines 990 are formed on the overcoat layer 975 and the photo spacers 972, as shown in FIG. 8E. A top view of the structure of FIG. 9E is shown in FIG. 9G (without showing the overcoat layer 975).

It should be noted that, the process of forming the first structure as shown in FIGS. 8A-8H and the process of forming the second structure as shown in FIGS. 9A-9G may be used altogether to form the first and second structures that match each other. In certain embodiments, however, the sizes and positions of the components and/or the structures of each of the first and second structures may be changed, and the forming process of each of the first and second structures may be changed correspondingly based on the change of the components and/or the structures.

Figure 10:
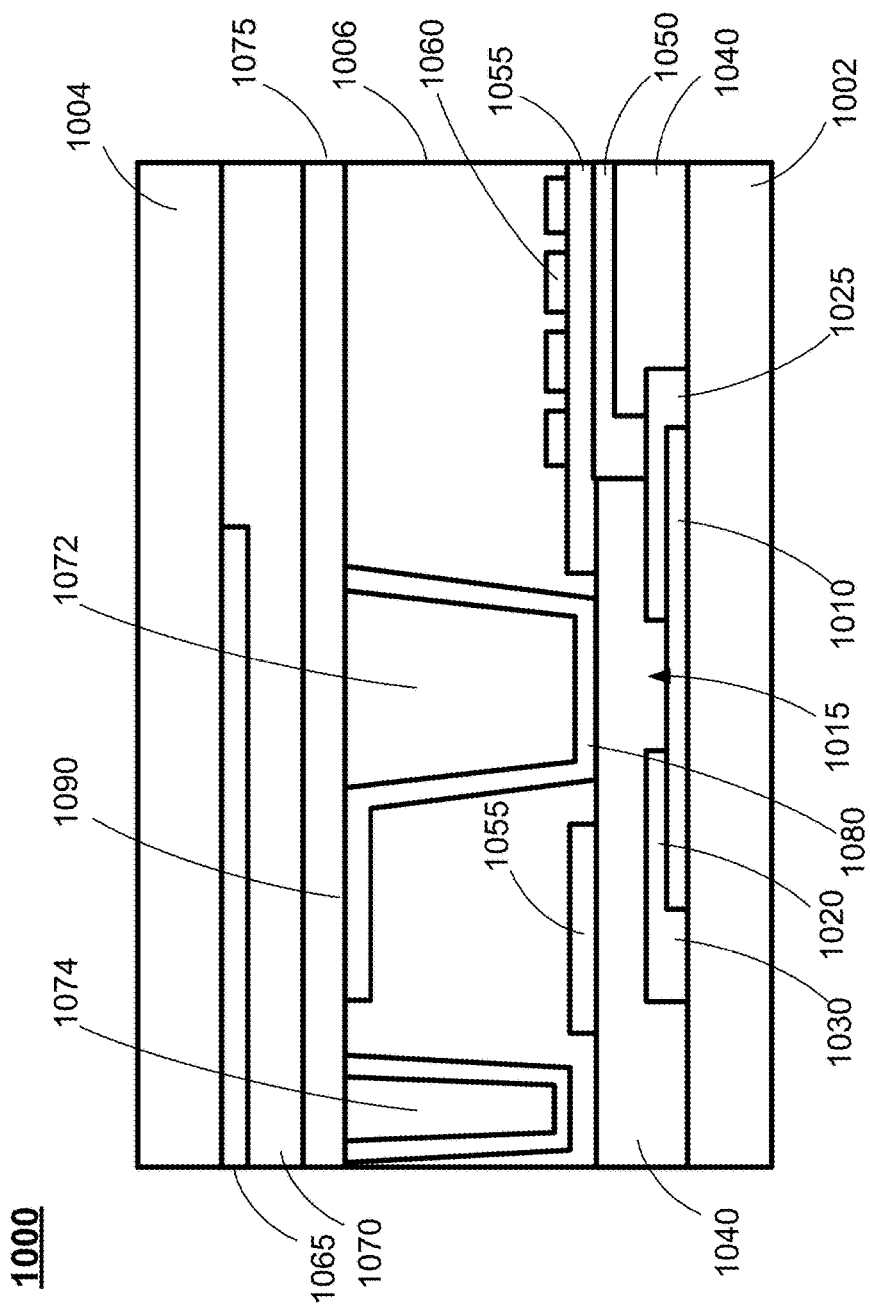
FIG. 10 schematically shows a cross-sectional view of a display device according to certain embodiments of the present disclosure.

FIG. 10 schematically shows a cross-sectional view of a display device according to certain embodiments of the present disclosure. In particular, the display device 1000 as shown in FIG. 10 refers to a cross-section of a pixel structure, which is mostly similar to the pixel structure 500 as shown in FIG. 5, with the exception that the second structure of the display device 1000 includes a black matrix layer 1065 disposed on the second substrate 1004 such that the color filter layer 1070 is disposed on the second substrate 1004 and the black matrix layer 1065, and an overcoat layer 1075 disposed on the second substrate 1004 to cover the black matrix layer 1065 and the color filter layer 1070. In this case, the photo spacers 1072 and 1074 and the gate line 1090 are disposed on the overcoat layer 1075. Other components of the display device 1000 as shown in FIG. 10 may be similar to the corresponding components of the display device 500 as shown in FIG. 5. For example, the liquid crystal layer 1006, the semiconductor layer 1010, the source electrode 1020 and the drain electrode 1025, the channel gap 1015, the data line 1030, the gate insulator layer 1040, the pixel electrode 1050, the passivation layer 1055, the common electrodes 1060, and the gate electrode 1080 as shown in FIG. 10 may be respectively similar to the liquid crystal layer 506, the semiconductor layer 510, the source electrode 520 and the drain electrode 525, the channel gap 515, the data line 530, the gate insulator layer 540, the pixel electrode 550, the passivation layer 555, the common electrodes 560, and the gate electrode 580 as shown in FIG. 5.

Figure 11:
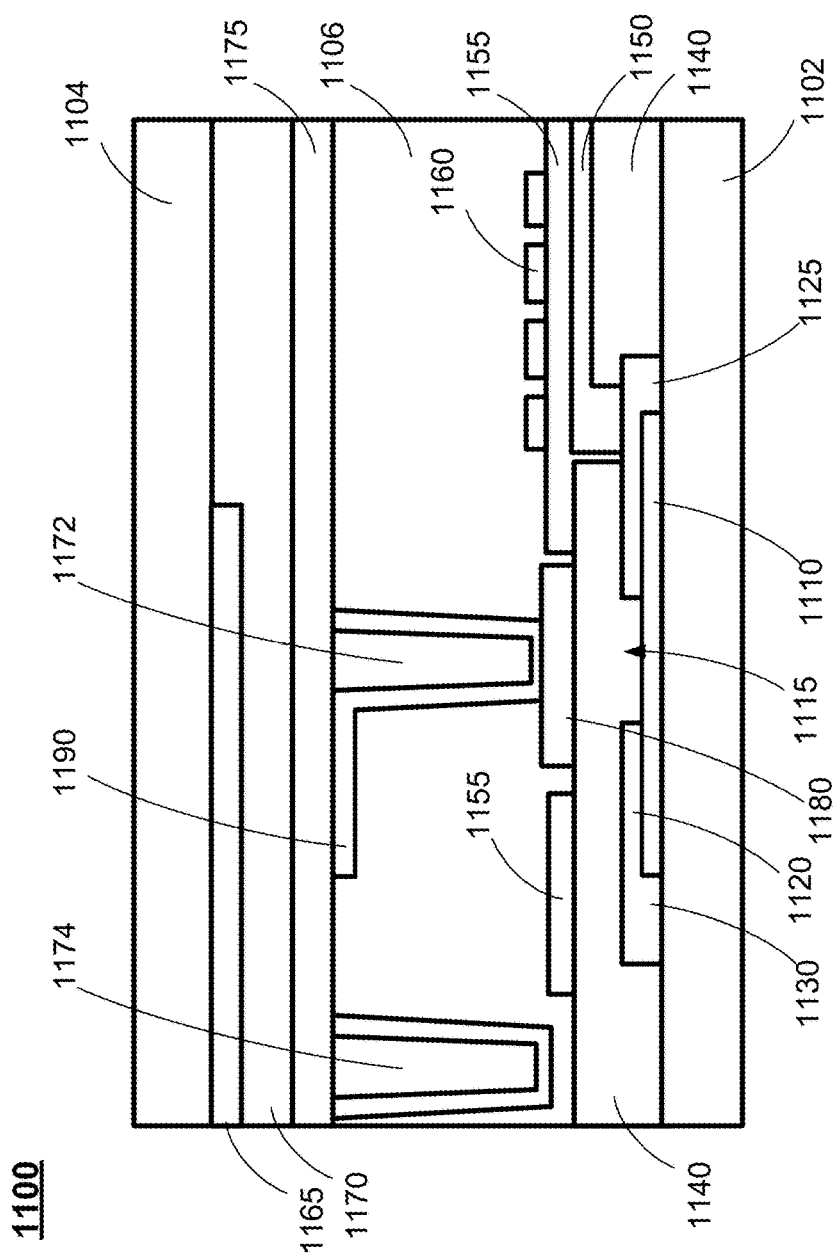
FIG. 11 schematically shows a cross-sectional view of a display device according to certain embodiments of the present disclosure.

FIG. 11 schematically shows a cross-sectional view of a display device according to certain embodiments of the present disclosure. In particular, the display device 1100 as shown in FIG. 11 refers to a cross-section of a pixel structure, which is mostly similar to the pixel structure 1000 as shown in FIG. 10, with the exception that the photo spacer 1172 of the second structure of the display device 1100 has a reduced size and width. In this case, the gate electrode 1180 may be directly formed on the gate insulation layer 1140 as a part of the first structure. Other components of the display device 1100 as shown in FIG. 11 may be similar to the corresponding components of the display device 1000 as shown in FIG. 10. For example, the first substrate 1102, the second substrate 1104, the liquid crystal layer 1106, the semiconductor layer 1110, the source electrode 1120 and the drain electrode 1125, the channel gap 1115, the data line 1130, the pixel electrode 1150, the passivation layer 1155, the common electrodes 1160, the black matrix layer 1165, the color filter layer 1170, the overcoat layer 1175, and the gate line 1190 as shown in FIG. 11 may be respectively similar to the first substrate 1002, the second substrate 1004, the liquid crystal layer 1006, the semiconductor layer 1010, the source electrode 1020 and the drain electrode 1025, the channel gap 1015, the data line 1030, the pixel electrode 1050, the passivation layer 1055, the common electrodes 1060, the black matrix layer 1065, the color filter layer 1070, the overcoat layer 1075, and the gate line 1090 as shown in FIG. 10.

Figure 12:
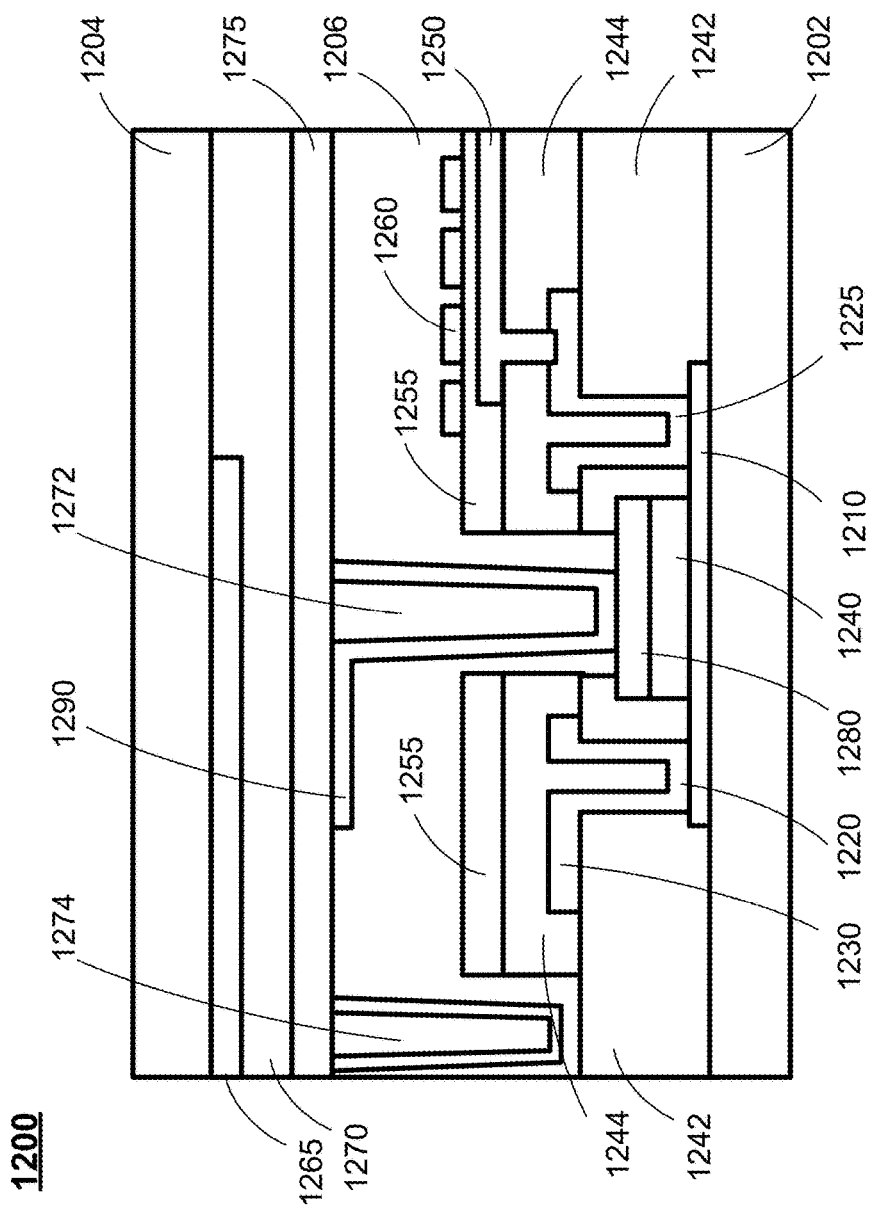
FIG. 12 schematically shows a cross-sectional view of a display device according to certain embodiments of the present disclosure.

FIG. 12 schematically shows a cross-sectional view of a display device according to certain embodiments of the present disclosure. In particular, the display device 1200 as shown in FIG. 12 refers to a cross-section of a pixel structure, which is similar to the pixel structure 1100 as shown in FIG. 11, with the exception that the shapes and positions of the components of the first structure are changed. For example, the size of the gate insulator layer 1240 is reduced to be about the same width as that of the gate electrode 1280. In other words, the width of the gate electrode 1280 is about the same as that of the portion of the gate insulator layer 1240 covering the semiconductor layer 1210. The shapes of the source electrode 1220 and the drain electrode 1225 are also changed, and additional insulator layers 1242 and 1244 are added, such that the data line 1230 is disposed between the insulator layers 1242 and 1244 instead of being directly disposed on the first substrate 1202. In this case, the relative positions of the gate electrode 1280 and the source/drain electrodes 1220 and 1225 may be adjusted. Other components of the display device 1200 as shown in FIG. 12 may be similar to the corresponding components of the display device 1100 as shown in FIG. 11. For example, the second substrate 1204, the liquid crystal layer 1206, the pixel electrode 1250, the passivation layer 1255, the common electrodes 1260, the black matrix layer 1265, the color filter layer 1270, the overcoat layer 1275, and the gate line 1290 as shown in FIG. 12 may be respectively similar to the second substrate 1104, the liquid crystal layer 1106, the pixel electrode 1150, the passivation layer 1155, the common electrodes 1160, the black matrix layer 1165, the color filter layer 1170, the overcoat layer 1175, and the gate line 1190 as shown in FIG. 11.

Figure 13:
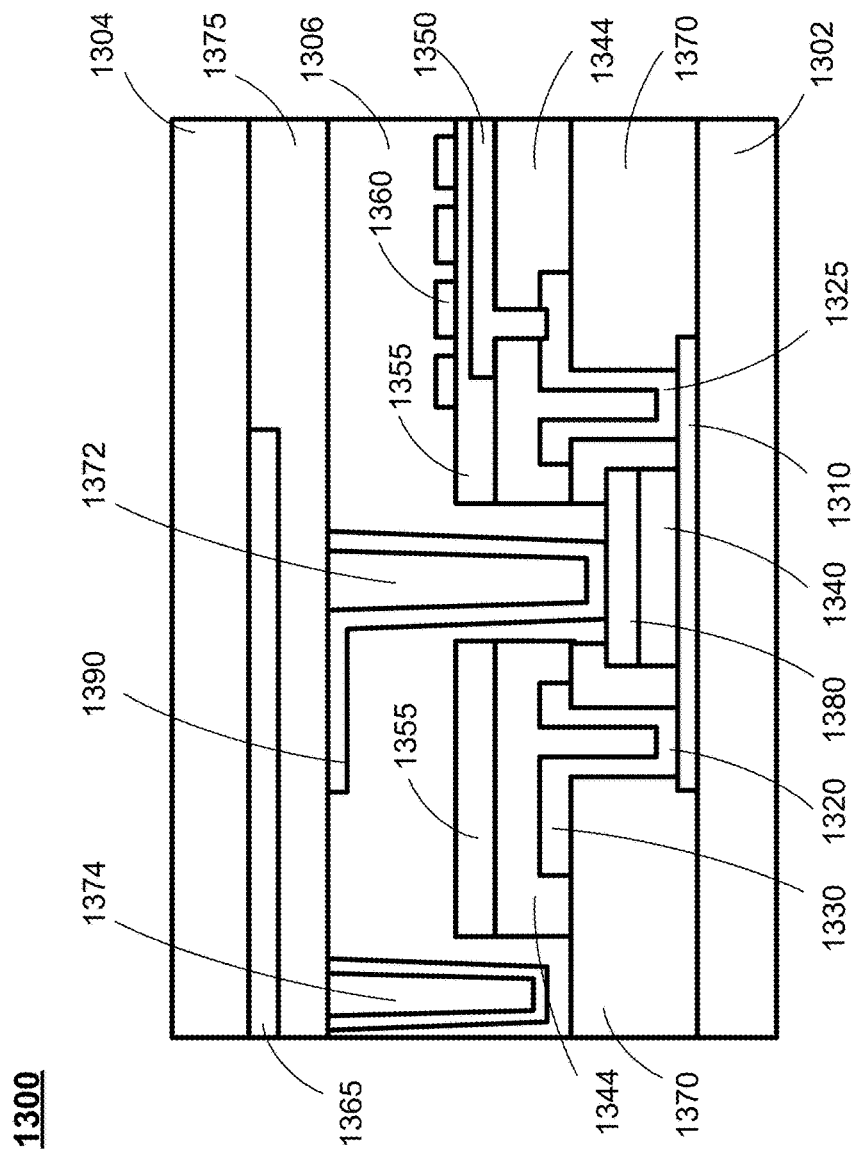
FIG. 13 schematically shows a cross-sectional view of a display device according to certain embodiments of the present disclosure.

FIG. 13 schematically shows a cross-sectional view of a display device according to certain embodiments of the present disclosure. In particular, the display device 1300 as shown in FIG. 13 refers to a cross-section of a pixel structure, which is similar to the pixel structure 1200 as shown in FIG. 12, with the exception that the color filter layer 1370 becomes a component of the first structure and not a part of the second structure. As shown in FIG. 13, in the first structure, the color filter layer 1370 is disposed on the first substrate 1302 and the semiconductor layer 1310. In other words, the color filter layer 1370 replaces the insulator layer 1242 as shown in FIG. 12. In this case, the electrode layer (i.e., the source electrode 1320, the drain electrode 1325 and the data line 1330) is disposed on the color filter layer 1370 and the semiconductor layer 1310. On the other hand, for the second structure, the overcoat layer 1375 covers only the black matrix layer 1365, since the color filter layer 1370 no longer exists in the second structure. Other components of the display device 1300 as shown in FIG. 13 may be similar to the corresponding components of the display device 1200 as shown in FIG. 12. For example, the second substrate 1304, the liquid crystal layer 1306, the gate insulator layer 1340, the pixel electrode 1350, the passivation layer 1355, the common electrodes 1360, the gate electrode 1380, and the gate line 1390 as shown in FIG. 13 may be respectively similar to the second substrate 1204, the liquid crystal layer 1206, the gate insulator layer 1240, the pixel electrode 1250, the passivation layer 1255, the common electrodes 1260, the gate electrode 1280, and the gate line 1290 as shown in FIG. 12.

Figure 14:
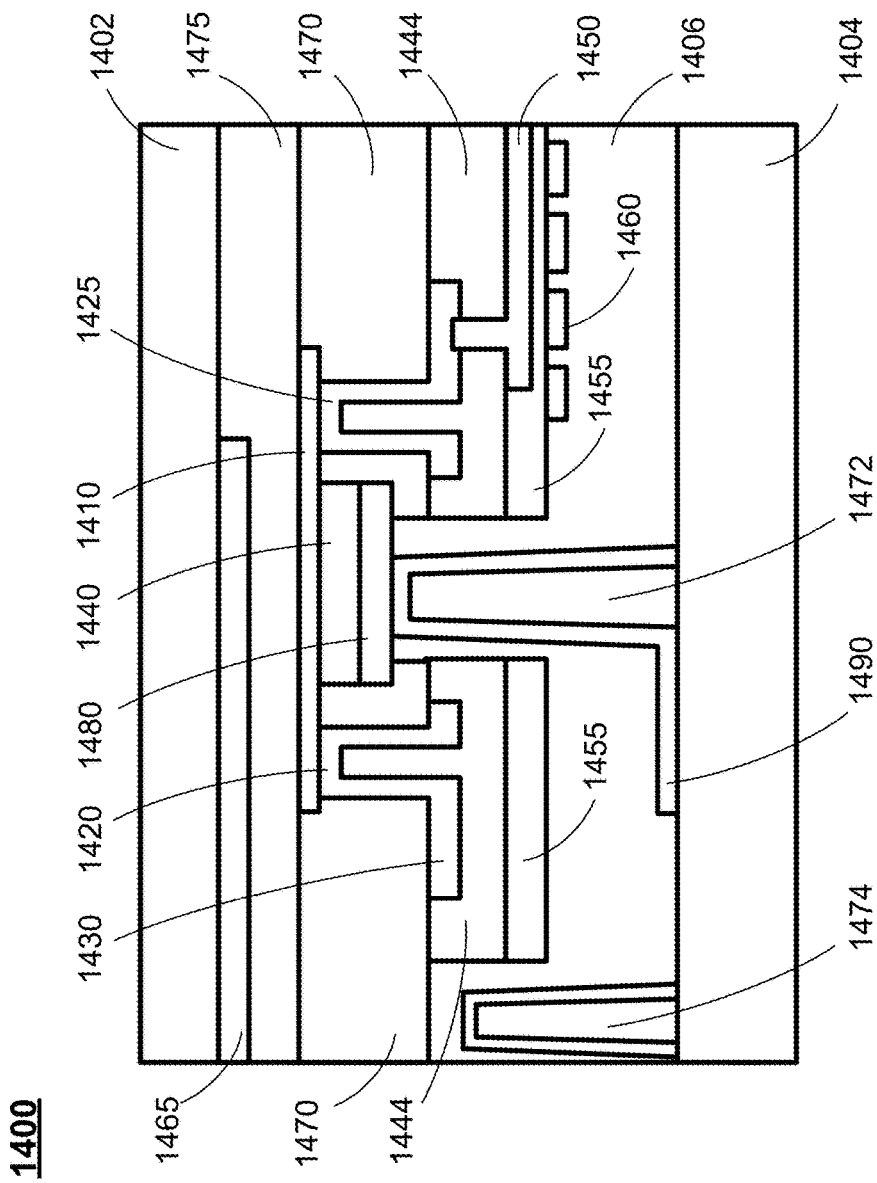
FIG. 14 schematically shows a cross-sectional view of a display device according to certain embodiments of the present disclosure.

FIG. 14 schematically shows a cross-sectional view of a display device according to certain embodiments of the present disclosure. In particular, the display device 1400 as shown in FIG. 14 refers to a cross-section of a pixel structure, which is essentially an inversed version of the pixel structure 1300 as shown in FIG. 13. As shown in FIG. 14, the first substrate 1402 is on the top side, and the second substrate 1404 is on the bottom side. Further, a difference between the pixel structure 1400 and the pixel structure 1300 as shown in FIG. 13 is that the black matrix layer 1465 and the overcoat layer 1475 become components of the first structure and not parts of the second structure. As shown in FIG. 14, in the first structure, the black matrix layer 1465 is disposed on the first substrate 1402, and the overcoat layer 1475 is disposed on the first substrate 1402 to cover the black matrix layer 1465. In this case, instead of being directly disposed on the first substrate 1402, the components of the first structure, such as the semiconductor layer 1410 and the color filter layer 1470, are disposed on the overcoat layer 1475. The gate insulator layer 1440 is disposed on the semiconductor layer 1410, and the gate electrode 1480 is disposed on the gate insulator layer 1440. On the other hand, the photo spacers 1472 and 1474, as well as the gate line 1490, are directly disposed on the second substrate 1404 since the overcoat layer 1475 and the black matrix layer 1465 no longer exists in the second structure. In this case, the second structure only includes the photo spacers 1472 and 1474 and the gate line 1490. Other components of the display device 1400 as shown in FIG. 14 may be similar to the corresponding components of the display device 1300 as shown in FIG. 13. For example, the liquid crystal layer 1406 as shown in FIG. 14 may be similar to the liquid crystal layer 1306 as shown in FIG. 13. Further, the components of the first structure, such as the source electrode 1420 and the drain electrode 1425, the channel gap 1415, the data line 1430, the pixel electrode 1450, the passivation layer 1455, and the common electrodes 1460 as shown in FIG. 14, may be respectively similar to the corresponding components of the first structure, such as the source electrode 1320 and the drain electrode 1325, the channel gap 1315, the data line 1330, the pixel electrode 1350, the passivation layer 1355, and the common electrodes 1360 as shown in FIG. 13.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A display device, comprising:
    a first substrate and a second substrate spaced apart from each other, defining a cell gap therebetween;
    a liquid crystal layer disposed in the cell gap between the first substrate and the second substrate and having liquid crystal molecules, the liquid crystal layer defining a plurality of pixels;
    a first structure disposed on the first substrate facing the liquid crystal layer, wherein the first structure comprises:
        a semiconductor layer disposed on the first substrate;
        an electrode layer disposed on the semiconductor layer to form a plurality of data lines, a plurality of source electrodes and a plurality of drain electrodes for the plurality of pixels, wherein in each pixel, the source electrode is electrically connected to a corresponding one of the data lines;
        a gate insulator layer disposed on the first substrate covering the semiconductor layer; and
        a first transparent conductive layer disposed on the gate insulator layer to form a plurality of pixel electrodes for the plurality of pixels, wherein in each pixel, the pixel electrode is electrically connected to the drain electrode;
    a second structure disposed on the second substrate facing the liquid crystal layer, wherein the second structure comprises:
        a plurality of photo spacers disposed on the second substrate and extended toward the first structure; and
        a plurality of gate lines respectively disposed on the second substrate; and
    a plurality of gate electrodes, each corresponding to one of the plurality of pixels and disposed on a corresponding photo spacer of the corresponding pixel, directly contacting the gate insulator layer and facing the semiconductor layer of the first structure, wherein in each pixel, the corresponding gate electrode is electrically connected to a corresponding one of the gate lines;
    wherein the data lines of the first structure and the gate lines of the second structure are spaced apart by the gate insulator layer and the liquid crystal layer.

2. The display device of claim 1, wherein the second structure further comprises:
    a black matrix layer disposed on the second substrate; and
    a color filter layer disposed on the second substrate and the black matrix layer, wherein the plurality of photo spacers and the plurality of gate lines are disposed on the color filter layer.

3. The display device of claim 1, wherein the second structure further comprises a black matrix layer disposed on the second substrate, wherein the plurality of photo spacers and the plurality of gate lines are disposed on the black matrix layer; and
    the first structure further comprises a color filter layer disposed on the first substrate and the semiconductor layer, wherein the electrode layer is disposed on the color filter layer and the semiconductor layer.

4. The display device of claim 1, wherein the first structure further comprises:
a black matrix layer disposed on the first substrate, wherein the semiconductor layer is disposed on the black matrix layer; and
a color filter layer disposed on the semiconductor layer, wherein the electrode layer is disposed on the color filter layer and the semiconductor layer.

5. The display device of claim 1, wherein the first structure further comprises:
a passivation layer disposed on the first substrate covering the first transparent conductive layer; and
a second transparent conductive layer disposed on the passivation layer to form at least one common electrode.

6. The display device of claim 1, wherein each of the gate electrodes is directly formed on the gate insulation layer as a part of the first structure.

7. The display device of claim 1, wherein a width of the gate electrode is about the same as that of a portion of the gate insulator layer covering the semiconductor layer.

8. The display device of claim 1, wherein in each pixel, the source electrode and the drain electrode are spaced apart to form a channel gap therebetween, such that the semiconductor layer is exposed in the channel gap, and the gate electrode is positioned to be substantially aligned with the semiconductor layer exposed in the channel gap.

9. The display device of claim 8, wherein an overlapping dimension of the gate electrode and the semiconductor layer exposed in the channel gap is greater than an alignment accuracy requirement value of the display device.

10. The display device of claim 1, wherein a thickness of the liquid crystal layer is about 3-4 μm, and a thickness of the gate insulator layer is about 0.3-0.4 μm.

11. A method for forming a display device, comprising:
forming a first structure on a first substrate by:
disposing a semiconductor layer on a first substrate;
disposing an electrode layer on the semiconductor layer to form a plurality of data lines, a plurality of source electrodes and a plurality of drain electrodes for a plurality of pixels of the display device, wherein in each pixel, the source electrode is electrically connected to a corresponding one of the data lines;
disposing a gate insulator layer on the first substrate covering the semiconductor layer; and
disposing a first transparent conductive layer on the gate insulator layer to form a plurality of pixel electrodes for the plurality of pixels, wherein in each pixel, the pixel electrode is electrically connected to the drain electrode;
forming a second structure on a second substrate by:
disposing a plurality of photo spacers on the second substrate; and
forming a plurality of gate lines on the second substrate;
forming a plurality of gate electrodes on the photo spacers, each of the gate electrodes corresponding to one of the plurality of pixels and disposed on a corresponding photo spacer of the corresponding pixel, wherein in each pixel, the corresponding gate electrode is electrically connected to a corresponding one of the gate lines;
positioning the first structure and the second structure to define a cell gap therebetween, wherein each of the gate electrodes is positioned to directly contact the gate insulator layer and face the semiconductor layer of the first structure; and
forming a liquid crystal layer having liquid crystal molecules in the cell gap,
wherein the data lines of the first structure and the gate lines of the second structure are spaced apart by the gate insulator layer and the liquid crystal layer.

12. The method of claim 11, further comprising:
disposing a black matrix layer on the second substrate; and
disposing a color filter layer on the second substrate and the black matrix layer, wherein the plurality of photo spacers and the plurality of gate lines are disposed on the color filter layer.

13. The method of claim 11, further comprising:
disposing a black matrix layer on the second substrate, wherein the plurality of photo spacers and the plurality of gate lines are disposed on the black matrix layer; and
disposing a color filter layer on the first substrate and the semiconductor layer, wherein the electrode layer is disposed on the color filter layer and the semiconductor layer.

14. The method of claim 11, further comprising:
disposing a black matrix layer on the first substrate, wherein the semiconductor layer is disposed on the black matrix layer;
disposing a color filter layer on the semiconductor layer, wherein the electrode layer is disposed on the color filter layer and the semiconductor layer.

15. The method of claim 11, wherein in each pixel, the source electrode and the drain electrode are spaced apart to form a channel gap therebetween, such that the semiconductor layer is exposed in the channel gap, and the gate electrode is positioned to be substantially aligned with the semiconductor layer exposed in the channel gap.

16. The method of claim 15, wherein an overlapping dimension of the gate electrode and the semiconductor layer exposed in the channel gap is greater than an alignment accuracy requirement value of the display device.

17. A display device, comprising:
a first substrate and a second substrate spaced apart from each other, defining a cell gap therebetween;
a liquid crystal layer disposed in the cell gap between the first substrate and the second substrate and having liquid crystal molecules, the liquid crystal layer defining a plurality of pixels;
a plurality of data lines formed on the first substrate and extending along a first planar direction, each electrically connected to a source electrode of a transistor of each of the plurality of pixels;
a plurality of gate lines formed on the second substrate and extending along a second planar direction substantially perpendicular to the first planar direction, each electrically connected to a gate electrode of the transistor of each of the plurality of pixels; and
a gate driver configured to provide gate signals to the plurality of gate lines;
wherein the data lines formed on the first substrate and the gate lines formed on the second substrate are spaced apart by a gate insulator layer and the liquid crystal layer along a third direction substantially perpendicular to the first planar direction and the second planar direction.

18. The display device of claim 17, wherein the transistor of each of the plurality of pixels comprises:

the source electrode disposed on the first substrate and a semiconductor layer and electrically connected to a corresponding data line, wherein the semiconductor layer is disposed on the first substrate;

a drain electrode disposed on the first substrate and the semiconductor layer; and the gate electrode directly contacting the gate insulator layer and facing a semiconductor layer;

wherein the source electrode and the drain electrode are spaced apart to form a channel gap therebetween, such that the semiconductor layer is exposed in the channel gap, and the gate electrode is positioned to be substantially aligned with the semiconductor layer exposed in the channel gap.

19. The display device of claim 18, further comprising:

a plurality of photo spacers disposed on the second substrate and extended toward the first substrate, wherein the gate electrode of the transistor of each of the plurality of pixels is disposed on a corresponding one of the photo spacers.

20. The display device of claim 19, wherein in each pixel, the gate electrode of the transistor is electrically connected to one of the gate lines via an electrical connecting portion disposed on the corresponding photo spacer.

\* \* \* \* \*